United States Patent
Plunk et al.

(10) Patent No.: US 10,769,000 B1
(45) Date of Patent: Sep. 8, 2020

(54) METHOD AND APPARATUS FOR TRANSPARENTLY ENABLING COMPATIBILITY BETWEEN MULTIPLE VERSIONS OF AN APPLICATION PROGRAMMING INTERFACE (API)

(71) Applicant: CLOUDFLARE, INC., San Francisco, CA (US)

(72) Inventors: Andrew Taylor Plunk, Austin, TX (US); Dane Orion Knecht, Austin, TX (US); Oliver Zi-gang Yu, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/553,101

(22) Filed: Aug. 27, 2019

(51) Int. Cl.
*G06F 9/54* (2006.01)
*G06F 9/50* (2006.01)
*G06F 9/38* (2018.01)
*G06F 9/445* (2018.01)

(52) U.S. Cl.
CPC ............ *G06F 9/541* (2013.01); *G06F 9/3891* (2013.01); *G06F 9/44536* (2013.01); *G06F 9/505* (2013.01)

(58) Field of Classification Search
None
See application file for complete search history.

(56) References Cited

U.S. PATENT DOCUMENTS

| | | | |
|---|---|---|---|
| 9,063,748 B1 * | 6/2015 | Bakale | |
| 2008/0028463 A1 | 1/2008 | Dagon et al. | |
| 2009/0217311 A1 * | 2/2009 | Kocyan | |
| 2013/0191509 A1 * | 7/2013 | Loughry | |
| 2017/0163603 A1 | 6/2017 | Xu | |
| 2019/0312888 A1 | 10/2019 | Grimm et al. | |

OTHER PUBLICATIONS

Sookocheff, Kevin, "Understanding API Gateway Payload Mappings," retrieved from the Internet: https://sookocheff.com/post/api/understanding-api-gateway-payload-mappings/, Oct. 21, 2016, 6 pages.
Non-Final Office Action, U.S. Appl. No. 16/553,105, dated Dec. 12, 2019, 15 pages.

* cited by examiner

*Primary Examiner* — Syed A Roni
(74) *Attorney, Agent, or Firm* — Nicholson De Vos Webster & Elliott LLP

(57) ABSTRACT

Methods and apparatuses for enabling compatibility between multiple versions of an application programming interface (API) are described. When a first API request is received at a compute server, the compute server determines whether the first API request is of a first version of an API that is different from a second version of the API used in an origin server to which the first API request is destined. In response to determining that the first API request is of the first version of the API that is different from the second version of the API used in the origin server to which the first API request is destined, an API compatibility enabler is executed to convert the first API request into a second API request in the second version of the API. The second API request is fulfilled instead of the first API request.

21 Claims, 13 Drawing Sheets

Account Schema in first version of API (API_v1)     302
```
{
 "$schema": "http://json-schema.org/draft-04/schema#",
 "$ref": "#/definitions/Account",
 "definitions": {
        "Account": {
        "required": [
        "name",
        "quota"
        ],
        "properties": {
        "account_type": {
        "enum": [
        "free",
        "pro"
        ],
        "type": "string"
        },
        "blocked": {
        "type": "boolean"
        },
        "created": {
        "type": "string",
        "format": "date-time"
        },
        "id": {
        "type": "string"
        },
        "name": {
        "type": "string"
        },
        "quota": {
        "type": "integer"
        },
        "tags": {
        "items": {
        "type": "string"
        },
        "type": "array"
        },
        "updated": {
        "type": "string",
        "format": "date-time"
        }
        },
        "additionalProperties": false,
        "type": "object"
        }
  }
}
```

FIG. 3A

Account Schema in second version of API (API_v2)

302

```
{
  "$schema": "http://json-schema.org/draft-04/schema#",
  "$ref": "#/definitions/Account",
  "definitions": {
        "Account": {
        "required": [
        "name"
        ],
        "properties": {
        "account_type": {
        "enum": [
        "free",
        "pro"
        ],
        "type": "string"
        },
        "blocked": {
        "type": "boolean"
        },
        "created": {
        "type": "string",
        "format": "date-time"
        },
        "id": {
        "type": "string"
        },
        "name": {
        "type": "string"
        },
        "tags": {
        "items": {
        "type": "string"
        },
        "type": "array"
        },
        "updated": {
        "type": "string",
        "format": "date-time"
        }
        },
        "additionalProperties": false,
        "type": "object"
        }
  }
}
```

FIG. 3B

ISOLATED EXECUTION
ENVRIONMENT MODEL

VIRTUAL MACHINE
MODEL

METHOD AND APPARATUS FOR TRANSPARENTLY ENABLING COMPATIBILITY BETWEEN MULTIPLE VERSIONS OF AN APPLICATION PROGRAMMING INTERFACE (API)

FIELD

Embodiments of the invention relate to the field of network computing; and more specifically, to a cloud computing platform that transparently enables compatibility between multiple versions of an application programming interface (API).

BACKGROUND

Historically, the use of web application code has been split between origin servers and browsers that are connected to one another by a network that transmits data from point to point. Initially, large websites and web applications were first run on large physical mainframe servers that could handle large traffic loads and large data transfers. Over time a switch was made to provide websites and web applications to be deployed on tens to hundreds of commodity servers that allowed for a reduction in cost, more fault tolerance, and increased performance. This technology is referred to as cloud computing. The technology for providing web applications further evolved to utilize virtual machines where one physical machine could be split into multiple virtual machines that can be independently managed. Virtual machines typically have a high overhead cost in terms of compute resources. For instance, each virtual machine is typically allocated hundreds of megabytes of random-access memory (RAM) and typically takes tens of seconds to boot. Virtual containers can be used to provide isolation between customers of the cloud computing platform and are less resource intensive than virtual machines. However, web application code running in a container typically is run in its own operating system (OS)-level process, consuming RAM, and inducing context-switching overhead. While native code can load quickly in a container, many server-oriented language execution environments are not optimized for startup time.

Some cloud computing platforms instantiate a containerized process for customer code and auto-scale the process which creates cold-starts. A cold-start occurs when a new copy of the code starts on a physical machine. When a new containerized process is instantiated, it can take between hundreds of milliseconds to multiple seconds (e.g., between 500 ms to 10 seconds) to complete. This means that any request to be serviced by the code to be executed in a container may be waiting for as much time as it takes to start execution of the new containerized process (e.g., for as much as ten seconds). Also, this containerized process can only process a single request at a time and a new containerized process must be cold-started each time an additional concurrent request is received. This means that each such request to be serviced by a new container can experience significant lag that does not improve over time. If the containerized process does not receive a request to be processed within a certain amount of time, it will automatically terminate, and a new containerized process will need to be cold-started again once a request is received. When new customer code is deployed, this entire process proceeds again as each containerized process needs to be instantiated anew.

BRIEF DESCRIPTION OF THE DRAWINGS

The invention may best be understood by referring to the following description and accompanying drawings that are used to illustrate embodiments of the invention. In the drawings:

FIG. 3A is a diagram of an example format of an API element in a first version of the API in accordance with some embodiments.

FIG. 3B is a diagram of a format of an API element in a second version of the API in accordance with some embodiments.

DESCRIPTION OF EMBODIMENTS

Figure 1:
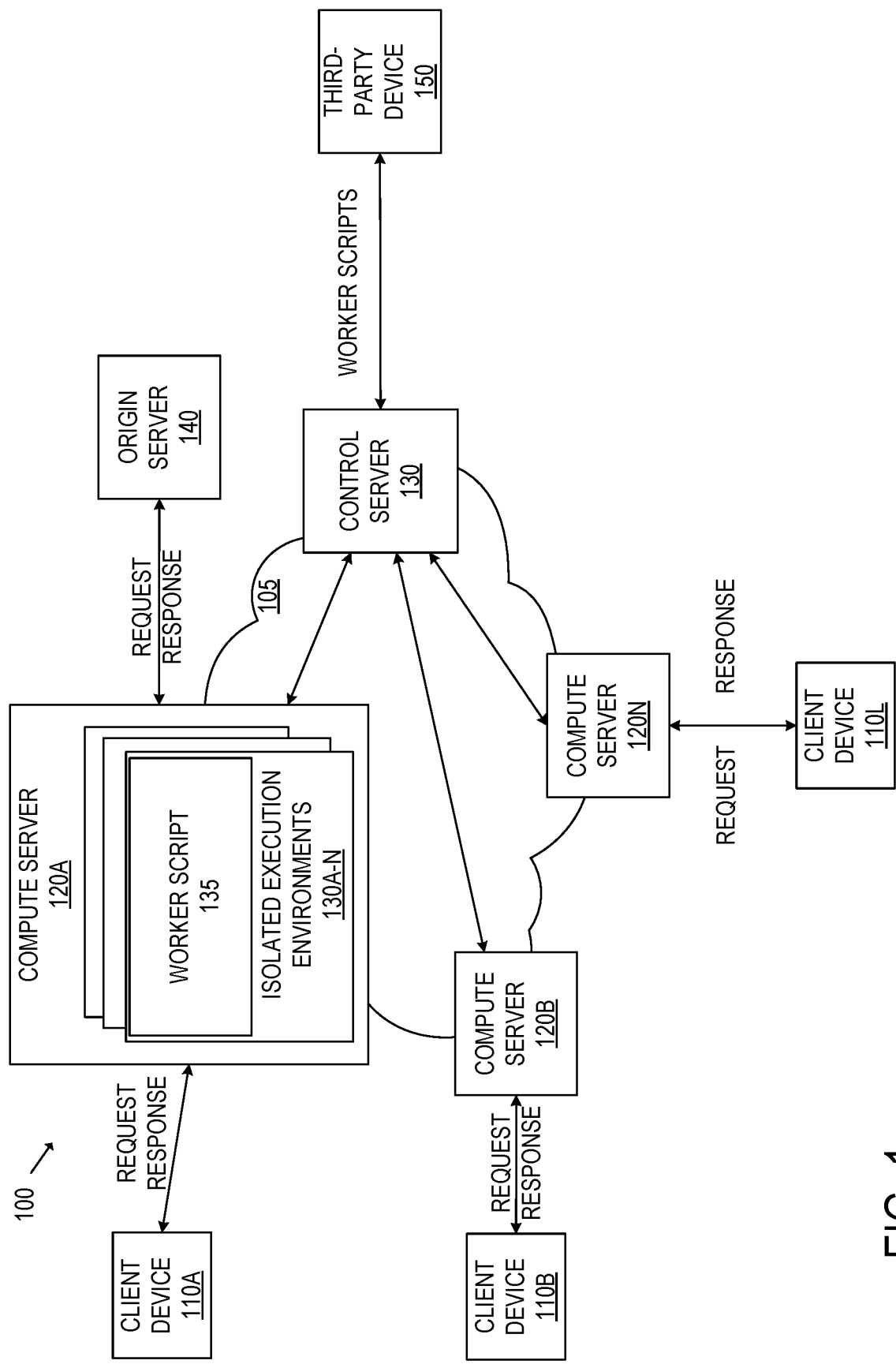
FIG. 1 illustrates an exemplary embodiment of a cloud computing platform that executes a script worker in a distributed cloud computing network, according to an embodiment.

Methods and apparatuses for execution of worker scripts in a distributed cloud computing network are described. The distributed cloud computing network includes multiple compute servers that are geographically distributed (e.g., in different locations throughout the world). There may be hundreds of compute servers that are geographically distributed in different points-of-presences (PoPs). Each PoP may include one or more physical servers (e.g., one or more compute servers, one or more control servers, one or more domain name system (DNS) servers (e.g., one or more authoritative name servers, one or more proxy DNS servers), and one or more other pieces of network equipment such as router(s), switch(es), and/or hub(s)). Each PoP may be part of a different data center and/or colocation site. The distributed cloud computing network may provide different services for customers (e.g., domain owners or operators).

Third-party code (e.g., code written by or deployed by third-parties such as customers of the cloud computing platform) can be deployed to all or some of the compute servers of the distributed cloud computing network. The third-party code can be, for example, a piece of JavaScript or other dynamically-typed language, a WebAssembly (WASM) compiled piece of code, or other compiled code. In an embodiment, the third-party code is compliant with the W3C standard ServiceWorker application programming interface (API). In some embodiments, the third-party code can, for example, intercept and answer hypertext transfer protocol (HTTP) requests and make outgoing HTTP subrequests as part of answering an HTTP request. For purposes of this description, each piece of third-party code is referred to as a worker script and an executed instance of the worker script is referred to as a worker. While the worker script is described as a third-party code, e.g., code written by or deployed by third-parties such as customers of the cloud computing platform, in other embodiments, the third-party code can be written by and/or deployed by entities (e.g., administrator, employees, etc.) of the cloud computing platform for and on behalf of the third-party.

A worker script of a particular third-party is run in an execution environment in which a single process can safely run third-party code. The process can contain multiple execution environments at the same time and the process can seamlessly switch between them. Code in one execution environment cannot interfere with code running in a different execution environment despite being in the same process. The execution environments are managed in user-space rather than by an operating system. Each execution environment uses its own mechanism to ensure safe memory access, such as preventing the code from requesting access to arbitrary memory (restricting its use to the objects it has been given) and/or interpreting pointers within a private address space that is a subset of an overall address space. This execution environment is not a container or virtual machine. For purposes of description, this type of execution environment is sometimes referred herein as an isolated execution environment. In a specific example implementation, the worker script is run in an isolate of the V8 JavaScript engine.

Because a single process can run multiple isolated execution environments, the overhead of running the isolated execution environments is incurred once (e.g., starting the single process to run the isolated execution environments) and isolated execution environments can be started and run with very little individual overhead. The worker scripts are not executed using a virtual machine or a container. Unlike other cloud computing platforms that spin up a containerized process for processing code that can take as much as ten seconds, an isolated execution environment can be started in as little as 5 ms because a new process does not need to be started (assuming the single process that runs the isolated execution environments is started). Also, since the worker scripts can be run in a single process, there are no expensive context switches like those experienced with other cloud computing platforms which means that more time is spent running the code instead of performing context switches. Also, because the implementations of the single process are shared between all isolated execution environments, the memory requirements are less than traditional cloud computing platforms.

In some embodiments, a worker script is executed on-demand (when and only if it is needed) at a particular compute server of the distributed cloud computing network. Each request for a content item that triggers execution of a worker script is handled at the compute server that is closest to the requesting client device. For instance, when receiving a request from a client device in New Zealand, a worker is run in a compute server in New Zealand that is closest to the client device. The compute server that receives the request may be determined by the network infrastructure according to an Anycast implementation or by a geographical load balancer.

FIG. 1 illustrates an exemplary embodiment of a cloud computing platform that executes a worker script in a distributed cloud computing network according to an embodiment. The cloud computing platform can provide different services such as protecting against internet-based threats, providing performance services for customers (e.g., acting as a content delivery network (CDN) and dynamically caching customer's files close to visitors, page acceleration, etc.), TCP stack optimizations, and/or other services. The cloud computing platform can provide additional services such as emulation of behavior of malicious domains and/or enabling compatibility between various API versions. The system 100 includes the client devices 110A-L, the compute servers 120A-N, the control server 130, the origin server 140, and the third-party device 150.

Each client device 110A-N is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages, images, word processing documents, PDF files, movie files, music files, or other computer files).

The compute servers 120A-N are part of the cloud computing platform. The compute servers 120A-N are physical servers and can be geographically distributed (e.g., in different locations throughout the world). The compute servers 120A-N are part of the distributed cloud computing network 105. There may be hundreds of compute servers as part of the cloud computing platform. Although not illustrated in FIG. 1, the compute servers 120A-N may be part of PoPs that may include other physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP (and each compute server) may be part of a different data center and/or colocation site. Although not illustrated in FIG. 1, there are other physical devices in the cloud computing network between the compute servers 120A-N such as routers, switches, and other intermediate computing devices.

The control server 130 is operated by the cloud computing platform and provides a set of tools and interfaces for a customer to, among other things, configure code to run in the cloud computing platform. For instance, the control server 130 may allow the customer to upload one or more worker scripts and may allow the customer to specify when the worker script(s) are to be run. The control server 130 may allow the customer to delete and update previously uploaded worker scripts or to modify the configuration of already uploaded worker scripts.

In one embodiment, the control server 130 deploys each worker script to each of the compute servers 120A-N automatically (without the customer selecting which of the compute servers 120A-N in which to deploy the worker script). In another embodiment, the control server 130 allows the customer to indicate which of the compute servers 120A-N are to be deployed a particular worker script. The control server 130 creates an identifier for each response inspector worker script. In an embodiment, the identifier is created by hashing the content of the worker script (e.g., using a cryptographic hash function such as SHA-256), where two scripts with identical content will have the same identifier even if uploaded by different customers and even if applied to different zones.

In an embodiment, the control server 130 allows a customer to provision one or more services (e.g., malicious domain emulation service, API compatibility service) to the cloud computing platform through DNS. For example, DNS record(s) of a customer are changed such that DNS records of hostnames point to an IP address of a compute server instead of the origin server. In some embodiments, the authoritative name server of the customer's domain is changed to an authoritative name server of the service and/or individual DNS records are changed to point to the compute server (or point to other domain(s) that point to a compute server of the service). For example, the customers may change their DNS records to point to a CNAME record that points to a compute server of the service. In one embodiment, customers may use the control server 130 to change their authoritative name server to an authoritative name server of the cloud computing platform and/or change their zone file records to have their domain point to the compute servers. Pointing the DNS or similar records to the compute server 120A enables the compute server to act as a proxy for requests directed to the origin server. In this manner, the requests for content items sent to the origin server and the responses thereto pass through the compute server and enable the one or more worker scripts to be executed.

The third-party device 150 is a computing device (e.g., laptop, workstation, smartphone, mobile phone, tablet, etc.) that is used by third-parties to, among other things, configure their worker scripts to run in the cloud computing platform. A third-party may be a customer of the cloud computing platform and/or a party that is configuring the worker script code to run in the cloud computing platform on behalf of the customer.

The origin server 140, which may be owned or operated directly or indirectly by the customer of the cloud computing platform, is a computing device on which a network resource resides, is generated, and/or otherwise originates (e.g., web pages, images, word processing documents, PDF files movie files, music files, or other content items). In an embodiment, the origin server 140 is not required to be in the cloud computing platform (e.g., response inspector code may run on the compute servers without communicating with an origin server). Although FIG. 1 illustrates the origin server 140 communicating with the compute server 120A, the origin server 140 may also communicate with one or more of the other compute servers 120N. Similarly, while FIG. 1 illustrates a case with a single origin server, the cloud computing platform can service any number of origin servers each with separate worker scripts distributed to the compute servers.

The compute servers 120A-N can be geographically distributed which decreases the distance between requesting client devices and the compute servers and decreases the time necessary to respond to a request. The compute servers 120A-N may operate as a reverse proxy and receive requests for network resources (e.g., HTTP requests) of a domain of the origin server 140. The particular compute server that receives a request from a client device may be determined by the network infrastructure according to an anycast implementation or by a geographical load balancer. For instance, the compute servers 120A-N may have a same anycast Internet Protocol (IP) address for a domain of the origin server 140. If the origin server 140 handles the domain "example.com," a domain name service (DNS) request for "example.com" returns an address record having the anycast IP address of the compute servers 120A-N. Which one of the compute servers 120A-N receives a request from a client device depends on which compute server 120 is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the compute servers 120A-N. By way of example, the client device 110A is closest to the compute server 120A, the client device 110B is closest to the compute server 120B, and the client device 110L is closest to the compute server 120N. Accordingly, requests from the client device 110A are received at the compute server 120A, requests from the client device 110B are received at the compute server 120B, and requests from the client device 110L are received at the compute server 120N. In some embodiments, instead of using an anycast mechanism, a geographical load balancer is used to route traffic to the nearest compute server. The number of client devices and compute servers illustrated in FIG. 1 is exemplary. The distributed cloud computing network 105 may include hundreds to thousands (or more) compute servers and each compute server may receive requests from thousands or more client devices.

In the example of FIG. 1, each of the compute servers 120A-N can execute the worker script(s) of a third-party. Each worker script is run in an isolated execution environment, such as running in an isolate of the V8 JavaScript engine. Thus, as illustrated in FIG. 1, the compute server 120A includes the isolated execution environments 130A-N that each executes a separate worker script 135. The isolated execution environment 130A-N are run within a single process. The worker scripts are not executed using a virtual machine or a container. In an embodiment, a particular worker script is loaded and executed on-demand (when and only if it is needed) at a particular compute server of the distributed cloud computing network. Each request for a domain can trigger handling by the worker script 135 and other worker scripts that will handle the request and response at the compute server that is closest to the requesting user. The worker script can include one or multiple modules that are to be executed upon request as part of the worker script to provide one or more services for customers of the cloud computing platform. The embodiments described herein below illustrate exemplary services that can be offered separately or in combination as part of the cloud computing platform based on worker scripts.

Enabling Compatibility Between Multiple Versions of an Application Programming Interface (API)

A method and apparatus that provides an API compatibility enabler in a distributed cloud computing network is described. The distributed cloud computing network may provide different services for customers (e.g., domain owners or operators) including API compatibility enablement via an API compatibility enabler that is executed at the compute servers.

The API compatibility enabler is executed as a third-party code at a PoP to enable API compatibility between client devices and origin servers. The API compatibility enabler converts API requests/responses of a first version of an API into API requests/responses of a second version of the API. The API compatibility enabler allows to automatically reconcile different versions of an API and enable an efficient and performant API request/response process between multiple client devices, which may have various API versions installed, and the origin server, which typically includes a more recent version of the API. According to some embodiments, the API compatibility enabler is implemented as a worker script or a function of a worker script.

In an embodiment, a particular API compatibility enabler is loaded as a part of a worker script and executed on-demand (when and only if it is needed) at a particular compute server of the distributed cloud computing network. Each API request/response that is determined to be of a different version than a version of the API implemented in an origin server triggers handling of the request/response by an API compatibility enabler at the compute server that is closest to the requesting client device. For instance, when responding to a client device in New Zealand, an API compatibility enabler and worker script is run in a compute server in New Zealand that is closest to the client device. The compute server that receives the request may be determined by the network infrastructure according to an Anycast implementation or by a geographical load balancer.

Figure 2A:
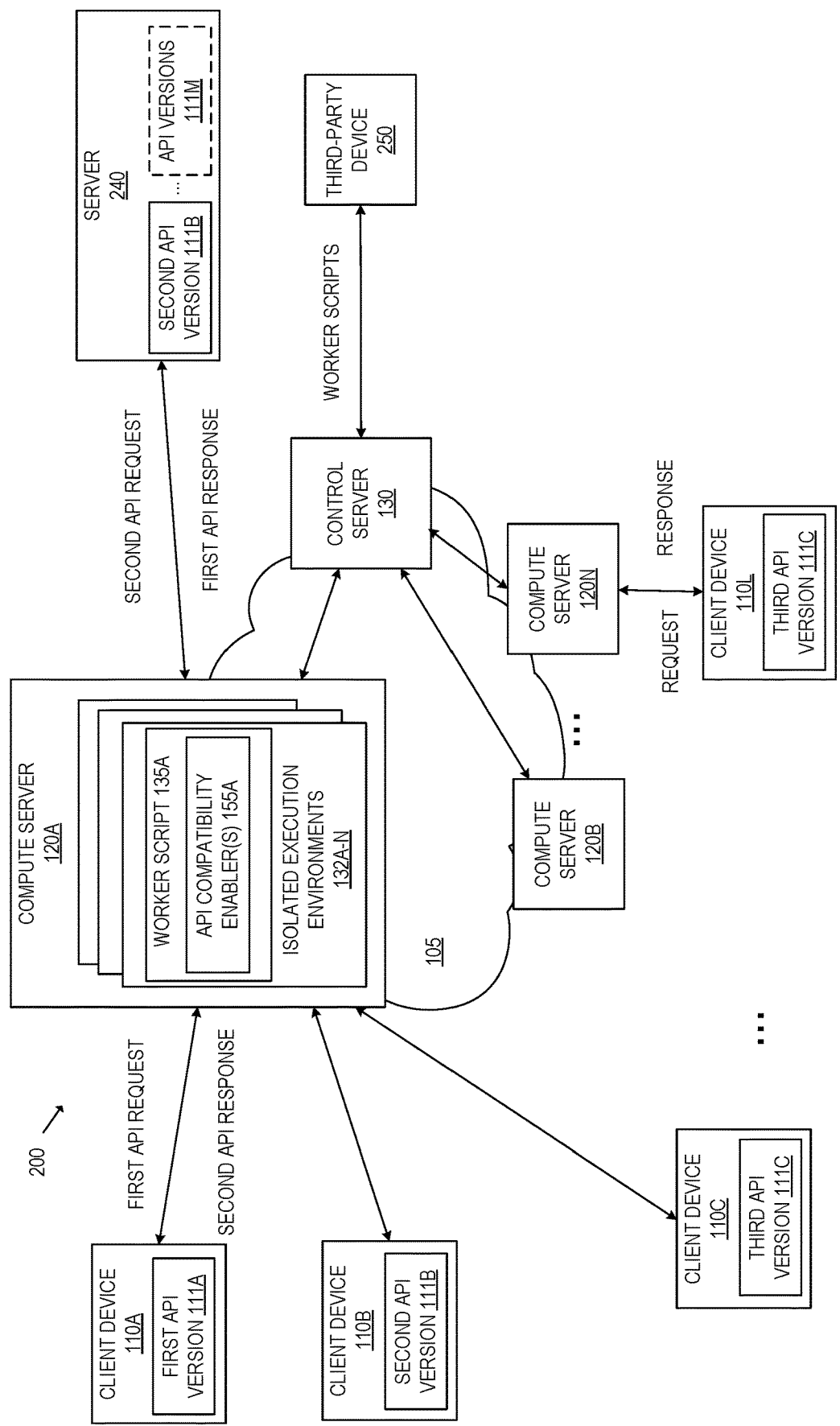
FIG. 2A illustrates an exemplary embodiment of a cloud computing platform that executes an API compatibility enabler in a distributed cloud computing network, according to an embodiment.

FIG. 2A illustrates an exemplary embodiment of a cloud computing platform that executes an API compatibility enabler in a distributed cloud computing network, according to an embodiment. The cloud computing platform can also provide different services in addition to the services of the API compatibility enabler such as protecting against internet-based threats, monitoring and emulating behavior of malicious domains, providing performance services for customers (e.g., acting as a content delivery network (CDN) and dynamically caching customer's files close to visitors, page acceleration, etc.), TCP stack optimizations, and/or other services. In the description herein the same reference numbers refer to the same elements as described in FIG. 1. For the sake of clarity, the operations and characteristics of these elements described with reference to FIG. 1 are not repeated herein. The system 200 includes the client devices 110A-L, the compute servers 120A-N, the control server 130, the origin server 240, and the third-party device 250.

In some embodiments, each one of the client devices 110A-L may store an API that is generated and/or maintained by a customer of the cloud computing platform. The API includes a set of subroutine definitions, communication protocols, and tools that can be used for building software applications. The API can be viewed as a software intermediary that allows an application on the client devices 110A-L to communicate with an application on the origin server 240. Each one of the client devices 110A-L can store a respective version of the API. For example, client device 110A stores a first API version 111A, the client device 110B stores a second API version 111B, and the client device 110C and 110L each store a third API version 111C. The first API version 111A and the second API version 111B are different such that one or more associated requests and/or responses of these API versions may include some differences. In the description herein, the second API version will correspond to the most recent API version stored at the server 240 and the first API version refers to an older version of the API stored at the client device. While the conversion herein will be described with respect to modifying the API requests/responses received from a client device into requests/responses of a most recent version of the API, in other embodiments, the conversion can be performed from any version of the API to any other version of the API that is different as it is determined by the API compatibility enabler(s).

The control server 130 may allow the customer to configure an API compatibility enabler 155A that allows conversion of API requests and/or API responses of one of multiple version of an API into API requests/responses of one or multiple versions of the API the origin server 240. By way of example, the control server 130 may allow the customer to configure a set of conversion rules of requests and/or responses from a first version of the API into a second version of the API. In some embodiments, the control server 130 may allow the customer to configure multiple API compatibility enablers, where each API compatibility enabler allows for conversion of API requests/responses according to a respective pair of API versions. The control server 130 may allow the customer to delete and update previously uploaded API compatibility enablers or to modify the configuration of already uploaded API compatibility enablers. The control server 130 can also provide tools to enable determination of the API version in which requests/responses are received from client device and/or origin servers.

The control server 130 deploys each API compatibility enabler to each of the compute servers 120A-N automatically (without the customer selecting which of the compute servers 120A-N in which to deploy the worker script). In another embodiment, the control server 130 allows the customer to indicate which of the compute servers 120A-N are to deploy a particular API compatibility enabler. In some embodiments, the control server 130 may create an identifier for each API compatibility enabler worker script. In an embodiment, the identifier is created by hashing the content of the API compatibility enabler (e.g., using a cryptographic hash function such as SHA-256), where two scripts with identical content will have the same identifier even if uploaded by different customers and even if applied to different zones.

In an embodiment, the control server 130 allows a customer to provision the API compatibility service provided through deployment of the API compatibility enabler(s) to the cloud computing platform through DNS. For example, DNS record(s) of a customer are changed such that DNS records of hostnames point to an IP address of a compute server instead of the origin server. In some embodiments, the authoritative name server of the customer's domain is changed to an authoritative name server of the service and/or individual DNS records are changed to point to the compute server (or point to other domain(s) that point to a compute server of the service). For example, the customers may change their DNS records to point to a CNAME record that points to a compute server of the service. In one embodiment, customers may use the control server 130 to change their authoritative name server to an authoritative name server of the cloud computing platform and/or change their zone file records to have their domain point to the compute servers. Pointing the DNS or similar records to the compute server 120A enables the compute server to act as a proxy for requests directed to the origin server. In this manner, the API requests sent to the origin server and the API responses thereto pass through the compute server and enable the API compatibility enabler to examine the requests and the responses and to convert the requests or the response when applicable.

The third-party device 250 is a computing device (e.g., laptop, workstation, smartphone, mobile phone, tablet, etc.) that is used by third-parties to, among other things, configure their API compatibility enabler to run in the cloud computing platform. A third-party may be a customer of the cloud computing platform and/or a party that is configuring API compatibility enabler code to run in the cloud computing platform on behalf of the customer. The third-party device 250 can be the same as the device 150 or a different device.

The server 240, which may be owned or operated directly or indirectly by the customer of the cloud computing platform, is a computing device on which a network resource resides, is generated, and/or otherwise originates (e.g., APIs, web pages, images, word processing documents, PDF files movie files, music files, or other content items). In an embodiment, the server 240 is not required to be in the cloud computing platform (e.g., API compatibility enabler code may run on the compute servers without communicating with an origin server). Although FIG. 2A illustrates the server 240 communicating with the compute server 120A, the server 240 may also communicate with one or more of the other compute servers 120B-N. Similarly, while FIG. 2A illustrates a case with a single server, the cloud computing platform can service any number of servers each with separate API compatibility enablers distributed to the compute servers.

The server 240 may host an API that is generated and/or maintained by the customer of the cloud computing platform. The API includes a set of subroutine definitions, communication protocols, and tools that can be used for building software applications. The API can be viewed as a software intermediary that allows an application on the client device such as devices 110A-L to communicate with an application on the origin server 140. The server 140 can include one or several version of the API 111B-M (e.g., second API version 111B, and one or more optional additional versions). In some embodiments, the server 240 includes only the most recent version of the API (e.g., first API version 111A). Alternatively, the server 240 may include the most recent version of the API as well as additional older version of the API (e.g., API versions 111M). In some embodiments, the server 240 may not include all the API versions that are supported by the client devices 110A-L.

In the example of FIG. 2A, each of the compute servers 120A-N can execute the worker script(s) of a third-party including an API compatibility enablers. Each worker script is run in an isolated execution environment, such as running in an isolate of the V8 JavaScript engine. Thus, as illustrated in FIG. 2A, the compute server 120A includes the isolated execution environments 132A-N that each executes a separate worker script 135A. The isolated execution environment 132A-N are run within a single process. The worker scripts are not executed using a virtual machine or a container. In an embodiment, a particular worker script, e.g., a worker script implementing an API compatibility enabler, is loaded and executed on-demand (when and only if it is needed) at a particular compute server of the distributed cloud computing network. Each request for a domain (e.g., an API request) can trigger handling by an API compatibility enabler and other worker scripts that will handle the request and response at the compute server that is closest to the requesting user.

The API compatibility enabler 155A is a worker script that is executed on behalf of a customer at a compute server to convert a request or a response from a format that corresponds to a first version of an API into a format that corresponds to a second version of the API. The operation of the API compatibility enabler is discussed herein below in further detail with reference to FIGS. 2B, 3A-B and 4A-B. When a first API request is received at a compute server, the compute server determines whether the first API request is of a first version of an API that is different from a second version of the API used in an origin server to which the first API request is destined. In response to determining that the first API request is of the first version of the API that is different from the second version of the API used in an origin server to which the first API request is destined, an API compatibility enabler is executed to convert the first API request into a second API request in the second version of the API. The second API request is fulfilled instead of the first API request.

The compute server 120A receives, from the server 240, a first API response in response to the second API request. The first API response is expressed in a format that corresponds to the first API version 111A. In response to determining that the first API response is of the second version of the API, the API compatibility enabler 155A converts the first API response into a second API response in the first version of the API. The second API response is transmitted to the client device 110A.

Figure 2B:
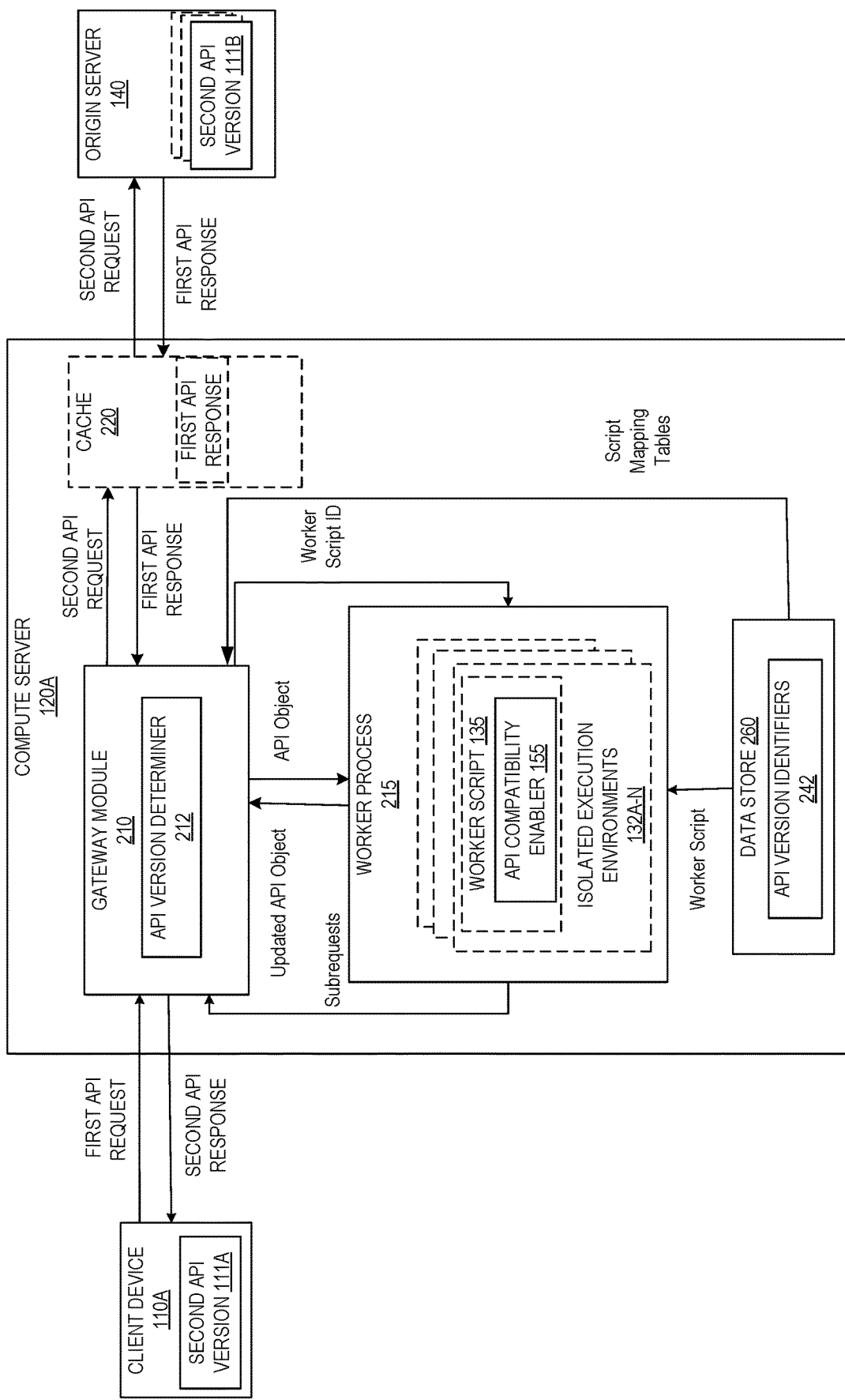
FIG. 2B illustrates an example of a compute server that is operative to execute an API compatibility enabler, according to one embodiment.

FIG. 2B illustrates an example of a compute server 120A that is operative to execute an API compatibility enabler, according to an embodiment. The compute server 120A includes a gateway module 210, a worker process 215, an optional cache 220, and a data store 260. The gateway module 210 receives and processes web requests and web responses (e.g., HTTP requests and HTTP responses such as HTTP API requests and HTTP API responses). The gateway module 210 may be acting as a reverse proxy for the server 240. In some embodiments, the gateway module 210 has access to the cache 220 that is configured to cache network resources (e.g., web pages, images, word processing documents, PDF files movie files, music files, or similar computer files), configuration files, scripts, APIs, and/or other content items. The data store 260 is configured to store, among other items, the worker scripts such as the API compatibility enabler that are received from the control server 130. The data store 260 may further be configured to store API version identifiers 242. The API version identifiers may include a set of API version identifiers that uniquely identify a set of API versions of an API that are currently supported at the origin server 140. For example, each one of the API version identifiers 242 may uniquely identify a respective one of the API versions 111B-M. The API version identifier of an API version is assigned to the API version upon its generation and storage at the origin server 140.

Each worker process 215 is a single process that executes the isolated execution environments 132A-N. There may be hundreds to thousands of isolated execution environments that are run simultaneously by the worker process 215. Each different worker script 135, such as the API compatibility enabler 155A, is run by a different one of the isolated execution environments 132A-N each with its own heap or similar memory structure. The worker process 215 starts an isolated execution environment to load a particular worker script on the first use of the worker script. Depending on the complexity of the worker script, loading the worker script may take approximately tens to hundreds of milliseconds of processor time. A worker script stays loaded in memory between requests so that the worker script can be used to respond quickly when a new request that triggers that worker script arrives. Handling a single request for a worker script that is already loaded typically takes a fraction of a millisecond of processor time depending on the complexity of the worker script. In an embodiment, one isolated execution environment is created per unique worker script identifier. Thus, if many zones use identical worker scripts, memory is saved by compiling the script only once. The worker process 215 evicts worker scripts (e.g., in a least recently used fashion). The worker process 215 may be started during the booting of the compute server 120A or when the first worker script is triggered for execution.

The gateway module 210 receives a request from the client device 110A. The request may be an HTTP request for a zone of the customer. A zone is a subset of a set of resources of the distributed computing platform. The gateway module 210 processes the request including determining whether the request triggers execution of a worker script such as the API compatibility enabler 155A. For instance, the gateway module 210 analyzes a uniform resource locator (URL) in the request against the URL matching pattern configured for the zone to determine if a worker script such as the API compatibility enabler 155A is to be executed. In some embodiments, HTTP request received from the client device 110A is an HTTP API request, and to determine whether the API compatibility enabler 155A is to be executed, the gateway module 210 may determine whether the API version of the API request received is different from the API version that is stored in the server 240. In some embodiments, this can be performed by determining in the URL of the first request, the version identifier of the API version of the first API request. In other embodiments, this can be performed by determining a version identifier of the API included in an HTTP header of the API request. In some embodiments, the gateway module 210 includes an API version determiner that is operative to determine whether the request triggers execution of the API compatibility enabler 155A. The API version determiner can be configured based on customer input (e.g., identifier of latest version stored at the origin server, a set of identifiers of API versions supported at the origin server, etc.).

If a worker script is not to be executed, the gateway module 210 retrieves a response to the first API request. To retrieve the response, the gateway module 210 may transmit the first API request to the server 240 or alternatively may retrieve the requested API content from the cache 220. In some embodiments, a worker script is not to be executed if the gateway module 210 determines that the first API request received from the client device 110A is of the same version as an API version supported by the server 240. For example, the API version can be the most recent version stored at the server 240, API version 111B, or alternatively one of previous versions of the API, which is still supported by the server 240.

If a worker script is to be executed, the gateway module 210 annotates the request with the identifier of the worker script to be executed as determined by a script mapping table and forwards the request to the worker process 215. If the identified worker script is already loaded (if there is already an isolated execution environment running an instance of the worker script), the worker process 215 does not need to load another instance of the worker script. However, if the identified worker script that is already loaded is from a different zone (which is probably from a different customer), the worker process 215 creates a separate context (a global object) for the worker script so that each zone has its own isolated global state. That prevents zones from interfering with the state of other zones. The gateway module 210 generates an updated request after the worker script(s) are executed. If the identified worker script is not loaded, the worker process 215 creates an isolated execution environment and loads and executes the worker script.

The executed worker script can take various actions depending on how the script is written. In some embodiments, the worker script may make one or more further requests (referred herein as "subrequests") such as additional HTTP requests. These subrequests may be destined for the server 240 or to other destinations on the internet. The worker process 215 sends the subrequests back to the gateway module 210 for further processing. In some embodiments, the gateway module 210 is configured to prevent the subrequest from looping back to the same worker script. But, the subrequest may trigger a different worker script potentially from a different zone. If the subrequest is to the same zone, the gateway module 210 transmits the subrequest (e.g., the second request) to the server 240 for processing and receives the first response from the server 240. If the subrequest triggers a worker script, the gateway module 210 annotates the request with the identifier of the worker script to be executed as determined by the script mapping table and forwards the request to the worker process 215 for executing the script.

Thus, a single request can trigger multiple worker scripts, even from different zones from different customers, to be run. Since the worker scripts are run on the same physical compute server, network latency to execute these scripts reduces to zero. Further, there is savings in bandwidth because the different origin zones may not need to be contacted. In the embodiments where an API compatibility enabler is among the triggered worker scripts, an example scenario is a customer that has an updated version of an API on the server 240 that is different from at least one version of the API that runs on one or more client devices. A client device sends an HTTP API request (e.g., first API request) that is destined to the server 240. Upon receipt of the first API request, the gateway module (e.g., through the API version determiner 212) determines that the version of the API of the first API request is different from any version of the API that are stored in the server 240. Upon determining that the version of the API of the first API request is different from any version of the API stored in the server 240, the gateway module 210 instantiates worker scripts to respond to the API request. The API compatibility enabler 155A is also instantiated. The API compatibility enabler 155A allows conversion of the first API request into a second API request that is compatible and conforms with a version of the API that the server 240 stores. In some embodiments, when the server 240 stores multiple versions of the API, the received first API request can be automatically converted into a second API request according to the most recent version of the API (e.g., the second version of the API 111B) stored at the server 240. In other embodiments, the first API request is converted into a second API request that is compatible with another version of the API (e.g., third version of the API 111C), which may be different from the most recent version of the API. For example, the API compatibility enabler 155A may include an indication of correspondence between two API versions (e.g., first version to third version, etc.) that defines the conversion that is to be performed for the first API request.

In some embodiments, an API element including one or more fields can be transmitted from the gateway module 210 to the API compatibility enabler 155A. In a non-limiting example the API element can be a JavaScript Object Notation (JSON) document, an eXtensible Markup Language (XML) document, or other types of data communication protocol format. The API compatibility enabler 155A modifies the API element to conform with the desired API version stored at the server 240. In some embodiments, modifying the API element may include removing a field from a set of fields of the API element, adding a field to the set of fields of the API element, modifying the name of a field from the set of fields of the API element, or modifying a type of a field from the set of fields of the API element. In some embodiments, one or a combination of these operations can be performed on fields of the API element to obtain an updated API element. The updated API element may include a subset of updated fields as well as unchanged fields from the set of fields. The updated API element is then sent to the gateway module to be included in a second API request. In some embodiments, the updated API element can be split into two or more elements with fields generated from the fields of the received API element. These set of updated API elements are sent to the gateway module to be sent as one or multiple API requests. For example, an updated version of an API may include two or more requests that replace a request in a previous version of the API. This scenario results in the first API request being converted into two or more API requests of the second version of the API.

The second API request is fulfilled by the gateway module 210. Fulfilling the second API request may include retrieving content from the cache 220 or alternatively transmitting the second API request to the server 240. Upon receipt of the second API request, the server 240 transmits a first API response. In some embodiments, the gateway module 210 fulfills more than one second API request. When the first API request is converted into more than one (i.e., two or more) updated API requests, the gateway module 210 fulfill a corresponding number of updated API requests instead of the first API request.

The first API response is received by the gateway module 210. In an embodiment, the content of the first API response can be stored in the cache 220. The gateway module 210 determines whether the API version of the first API response is different from the API version of the first request received from the client device. Upon determining that the version of the API of the first API response is different from the API version of the first API request received from the client device, the gateway module 210 instantiates worker scripts to convert the first API response into a second API response that is compatible with the first API version of the client device. The API compatibility enabler 155A is also instantiated. The API compatibility enabler 155A allows conversion of the first API response into a second API response that is compatible and conforms with a version of the API of the client device.

In some embodiments, an API element including one or more fields can be transmitted from the gateway module 210 to the API compatibility enabler 155A. In a non-limiting example the API element can be a JSON document, an XML document, or other types of data format. The API compatibility enabler 155A modifies the API element to conform with the desired API version of the client device that is to receive the response. In some embodiments, modifying the API element may include removing a field from the set of fields, adding a field to the set of fields, modifying the name of a field from the set of fields, or modifying a type of a field from the set of fields. In some embodiments, one or a combination of these operations can be performed on fields of the API element to obtain an updated API element. The updated API element may include a subset of updated fields as well as unchanged fields from the set of fields. The updated API element is then sent to the gateway module to be included in a second API response. The second API response is transmitted to the client device 110A.

While the embodiments described above describe a scenario where requests/responses of a first version of an API are converted into requests/responses of a second version of the API, in other embodiments, only one of a request or response may need to be converted. For example, when an API is updated one or more fields of a request are updated while fields of the response to the request may not be updated. In this first scenario, a compute server may convert the request from a first version of an API to a second request in a second version of the API without converting the response that is received. In another example, when the API is updated one or more fields of a response are updated while fields of the request may not be updated. In this second scenario, a compute server may convert the response from a first version of an API to a second response in a second version of the API without converting the request that is received.

The embodiments described herein enable a transparent and efficient compatibility of multiple API versions between client devices and an origin server. The compute server automatically determines whether a request or response needs to be converted and using a worker script enables a fast execution of the conversion from the first version to a second version. A customer of the cloud computing platform that operates/deploy an API may deploy different API compatibility enablers, where each API compatibility enabler is operative to enable conversion from a first version of the API to a second version of the API. The system described herein enables a dynamic update of API conversion as API compatibility enablers can be progressively added to compute servers to enable backward compatibility with previous version of an API.

FIG. 3A-B provide an example of schema of an API element "Account." While the example herein will be described with respect to JSON schemas, JSON data format, and HTTP requests, other data formats and protocols can be used without departing from the scope of the present invention. While the API elements are described with respect to a given format and number of fields, one of ordinary skill in the art would understand that this is intended to be exemplary only and should not be regarded as a limitation of the embodiments described herein. Any other API elements can be considered with varying numbers and types of fields. FIG. 3A is a diagram of an example format of an API element in a first version of the API in accordance with some embodiments. The account schema 300 (e.g., JSON Schema) illustrates an exemplary format that defines the structure of an account API element in the first version of the API. FIG. 3B is a diagram of a format of an API element in a second version of the API in accordance with some embodiments. The illustrated format 302 represents the same type of API element "account" but differs from the API element of format 300 in the first version of the API in that the field quota is no longer present. In the format 300, the field quota is required while it is no longer present in the format 302.

In some embodiments, the client device 110A may transmit a request to the server 240 including the API element of format 300 expressed according to the first version of the API. For example, the request may be a POST/v1/account Body: {"name": "Jane Doe", "quota":100}. Upon receipt of the API request from the client device 110A, the API version determiner 212 determines that the version of the API (v1) is not supported by the server 240. This causes the execution of the API compatibility enabler 155A as part of the worker script 135 to transform the request into a request that is valid according to the second version of the API that is supported by the origin server. For example, a second request is output including POST/v2/account Body:{"name": "Jane Doe"}. In this example, the transformation is performed by removing a field "quota" from the API element and outputting an API element that corresponds to the format 302 in the second version of the API.

In some embodiments, the compute server 120A may receive a response including the API element of format 302 expressed according to the second version of the API. For example, the response may be a GET/v2/account Body: {"name": "Jane Doe"}. Upon receipt of the API response, the API version determiner 212 determines that the version of the API (v2) is not supported by the client device 110A to which the response is destined. This causes the execution of the API compatibility enabler 155A as part of the worker script 135 to transform the response into a response that is valid according to the first version of the API that is supported by the client device. For example, a second response is output including GET/v1/account Body: {"name": "Jane Doe", "quota":0}. In this example, the transformation is performed by adding a field "quota" with a default value (e.g., 0) to the API element and outputting an API element that corresponds to the format 300 in the first version of the API.

Figure 4A:
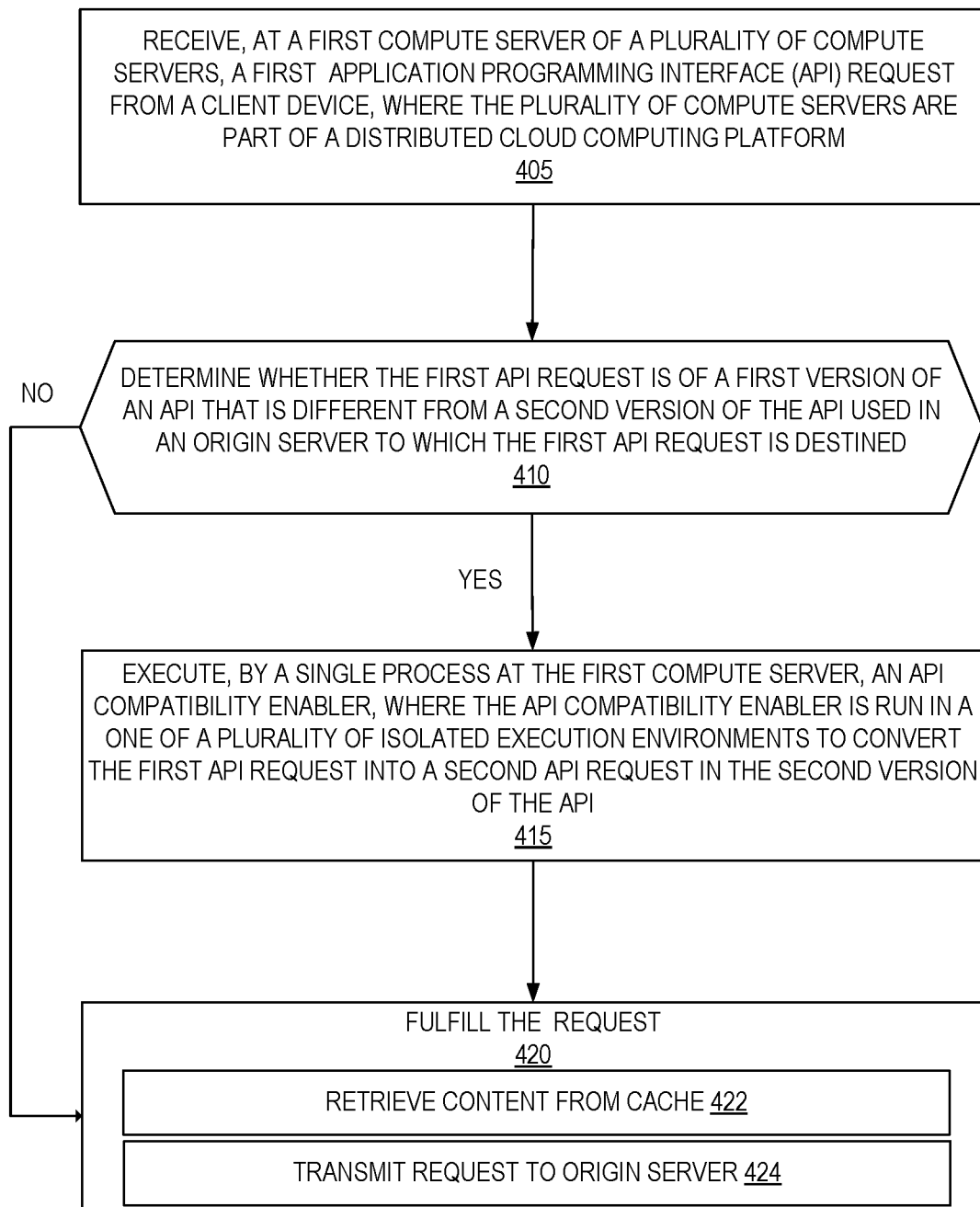
FIG. 4A is a flow diagram that illustrates exemplary operations for executing an API compatibility enabler in a distributed cloud computing network, according to an embodiment.
Figure 4B:
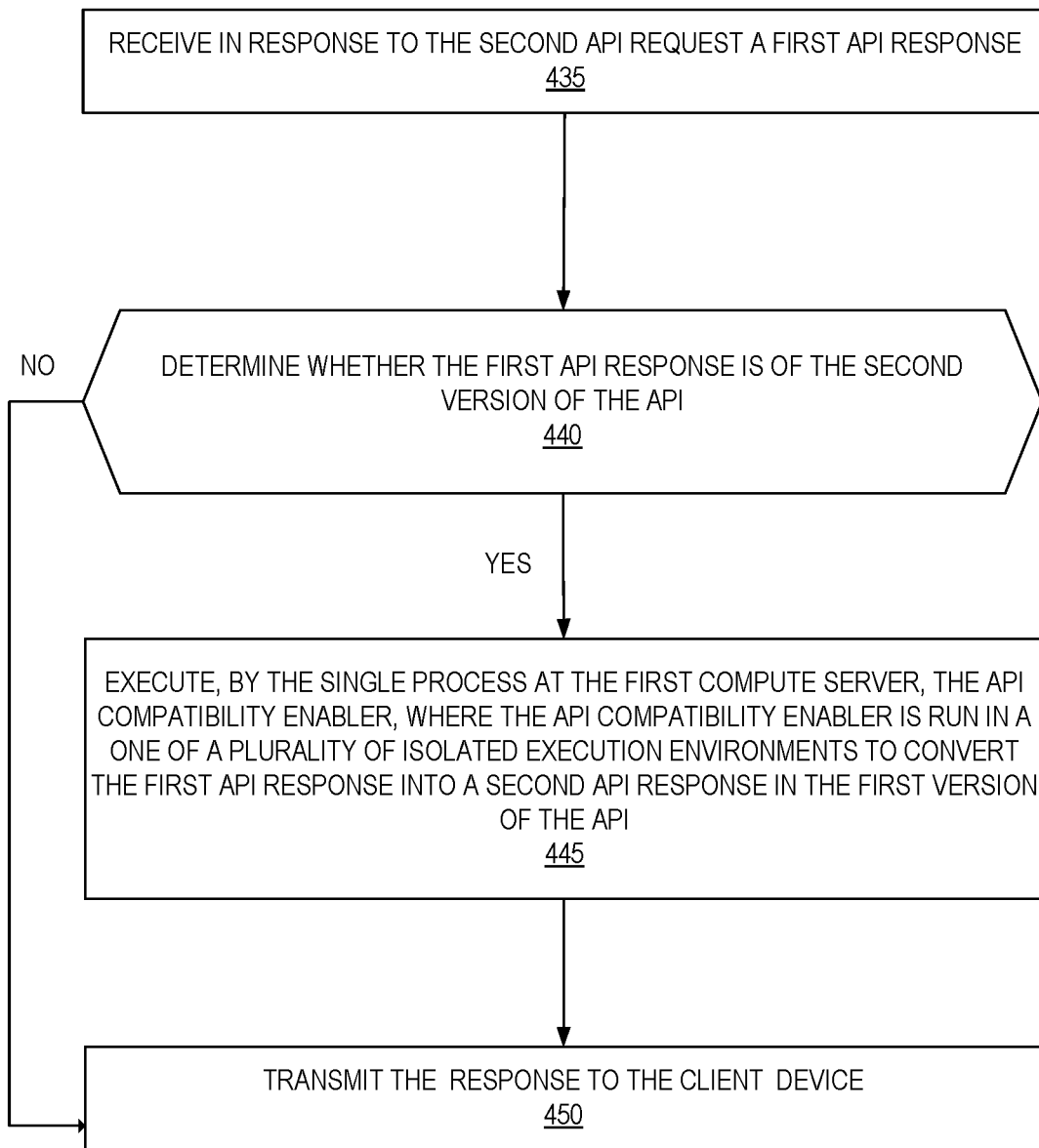
FIG. 4B illustrates a flow diagram of exemplary operations for executing an API compatibility enabler in a distributed cloud computing network, in accordance with some embodiments.

The operations of FIGS. 4A-B are described with respect to the exemplary embodiment of FIGS. 1 and 2. However, the operations of FIGS. 4A-B can be performed by different embodiments than those of FIGS. 1 and 2, and the embodiment described in FIGS. 1 and 2 can perform operations different from those of FIGS. 4A-B. The operations of FIGS. 4A-B will be described with respect to HTTP/S requests and responses. But, the operations of FIGS. 4A-B can be performed with different types of network resource requests and responses.

FIG. 4A is a flow diagram that illustrates exemplary operations for executing an API compatibility enabler in a distributed cloud computing network according to an embodiment. The operations of FIG. 4A are performed for converting a request from a first version of an API to a second version of the API.

At operation 405, a first one of multiple compute servers of a distributed cloud computing network receives an API request that triggers execution of an API compatibility enabler. The request may be received from a client device and be an HTTP or HTTPS request, for example, destined for a zone. The API compatibility enabler is one of multiple worker scripts that can be executed by the first compute server in response to the request. The API compatibility enabler may be a third-party code piece (written and/or provided by an owner or operator of the zone). The API compatibility enabler can be, for example, a piece of JavaScript or other dynamically-typed language, a WASM compiled piece of code, or other compiled code.

At operation 410, the first compute server determines whether the request is an API request of a first version of an API that is different from a version of the API stored at the origin server. For example, the compute server may compare a version identifier that uniquely identifies the API version of the API request with a set of version identifiers that uniquely identify the API version stored at the origin server. The first API request can be an HTTP APIT request. The version identifier of the HTTP API request can be included in the URL of the HTTP API request or alternatively in an HTTP header of the request. Upon determining that the version identifier of the HTTP API request is not included in the set of version identifiers, the compute server triggers execution of the API compatibility enabler and the flow of operations moves to operation 415. Alternatively, upon determining that the version identifier of the HTTP API request is included in the set of version identifiers, the compute server does not trigger execution of the API compatibility enabler and the flow of operations moves to operation 420. With respect to FIG. 1, the compute server 120A receives a first API request from the client device 110A that triggers execution of a working script such as the API compatibility enabler. In one example, the API request is an HTTP GET method for "api.example.com," with an HTTP Header including a version identifier of a first version of the API, where the version identifier does not match any version identifiers stored at the origin server triggers execution of an API compatibility enabler to convert the HTTP GET request into an HTTP GET request in a second version of the API.

The distributed cloud computing network includes multiple compute servers including the first compute server. The compute servers are geographically distributed. There may be hundreds or more compute servers. In an embodiment, each of the compute servers are anycasted to a same IP address, and the first compute server receives the request in operation 405 because the first compute server is the closest one of the compute servers to the client device making the request as determined by an anycast implementation. For instance, a DNS request for an address record of the zone "example.com" returns an anycasted IP address of the compute servers. Alternatively, the first compute server may receive the request as a result of a geographical load balancer routing the request to it.

In an embodiment, each of the compute servers of the distributed cloud computing network includes the working scripts such as the API compatibility enabler. The API compatibility enabler code can be deployed to each of the compute servers without the owner or operator of the zone selecting which of the compute servers are to receive and potentially run the API compatibility enablers. In an alternative embodiment, the owner or operator of the zone selects which of the compute servers are to receive and potentially run the API compatibility enablers.

Next, at operation 415, a single process at the first compute server, executes the API compatibility enabler to convert the first API request into the second API request in the second version of the API. The API compatibility enabler 155A allows conversion of the first API request into a second API request that is compatible and conforms with a version of the API that the server 240 stored. In some embodiments, when the server 240 stores multiple versions of the API, the received first API request can be automatically converted into a second API request according to the most recent version of the API (e.g., the second version of the API 111B) stored at the server 240. In other embodiments, the first API request is converted into a second API request that is compatible with another version of the API (e.g., third version of the API 111C), which may be different from the most recent version of the API. For example, the API compatibility enabler 155A may include an indication of correspondence between two API versions (e.g., first version to third version, etc.) that defines the conversion that is to be performed for the first API request.

In some embodiments, an API element including one or more fields can be transmitted from the gateway module 210 to the API compatibility enabler 155A. In a non-limiting example the API element can be a JavaScript Object Notation (JSON) document, an eXtensible Markup Language (XML) document, or other types of data communication protocol format. The API compatibility enabler 155A modifies the API element to conform with the desired API version stored at the server 240. In some embodiments, modifying the API element may include removing a field from the set of fields, adding a field to the set of fields, modifying the name of a field from the set of fields, or modifying a type of a field from the set of fields. In some embodiments, one or a combination of these operations can be performed on fields of the API element to obtain an updated API element. The updated API element may include a subset of updated fields as well as unchanged fields from the set of fields. The updated API element is then sent to the gateway module to be included in a second API request. In some embodiments, one or a combination of these operations can be performed on fields of the API element to obtain an updated API element. The updated API element may include a subset of updated fields as well as unchanged fields from the set of fields. The updated API element is then sent to the gateway module to be included in a second API request. In some embodiments, the updated API element can be split into two or more elements with fields generated from the fields of the received API element. These set of updated API elements are sent to the gateway module to be sent as one or multiple API requests. For example, an updated version of an API may include two or more requests that replace a request in a previous version of the API. This scenario results in the first API request being converted into two or more API requests of the second version of the API.

The second API request is fulfilled, at operation 420, by the gateway module 210. Fulfilling the second API request may include retrieving content from the cache 220, at operation 422, or alternatively transmitting, at operation 424, the second API request to the server 240. In all embodiments, the second API request is fulfilled instead of the first API request causing the compute server to automatically provide an API request that is compatible with the API version stored at the origin server. In some embodiments, the gateway module 210 fulfills more than one second API request. When the first API request is converted into more than one (i.e., two or more) updated API requests, the gateway module 210 fulfills a corresponding number of updated API requests instead of the first API request.

FIG. 4B illustrates a flow diagram of exemplary operations that can be performed upon receipt of a response to the second API request, in accordance with some embodiments. At operation 435, a first API response is received by the gateway module 210. The first API response can be received as a result of retrieving content from the cache 220 according to the second API request. Alternatively, the first API response can be received from the server 240 as a result of the transmission of the second API request. In an embodiment, upon receipt of the first API response from the origin server, the content of the first API response can be stored in the cache 220 to respond to future similar requests from client devices. In some embodiments, the gateway module 210 may receive two or more API responses that result from the first API request.

At operation 440, the gateway module 210 determines whether the API version of the first API response is different from the API version of the first API request received from the client device. For example, the compute server may compare a version identifier that uniquely identifies the API version of the first API response with the version identifier of the first API request. Upon determining that the version identifier of the first API response is different from the API version of the first API request, the compute server triggers execution of the API compatibility enabler and the flow of operations moves to operation 445. Alternatively, upon determining that the version identifier of the first API response is not different from the version of API of the first API request, the compute server does not trigger execution of the API compatibility enabler and the flow of operations moves to operation 450. With respect to FIG. 1, the compute server 120A receives a first API response either from the cache 220 or from the server 240. The first API response triggers execution of a working script such as the API compatibility enabler. In one example, the API response is an HTTP response, with an HTTP Header including a version identifier of a second version of the API, where the version identifier does not match the version identifier of the API version of the HTTP request. The HTTP response triggers execution of an API compatibility enabler to convert the first HTTP response into a second HTTP response in a first version of the API.

At operation 445, upon determining that the version of the API of the first API response is different from the API version of the first API request received from the client device, the gateway module 210 instantiates and executes worker scripts to convert the first API response into the second API response that is compatible with the first API version of the client device. The API compatibility enabler 155A is also instantiated and executed. The API compatibility enabler 155A allows conversion of the first API response into a second API response that is compatible and conforms with a version of the API of the client device. In some embodiments, the API compatibility enabler 155A may use two or more responses of the second version of the API to convert them into a single API response of the first version of the API.

In some embodiments, an API element including one or more fields can be transmitted from the gateway module 210 to the API compatibility enabler 155A. In a non-limiting example the API element can be a JSON document, an XML document, or other types of data format. The API compatibility enabler 155A modifies the API element to conform with the desired API version of the client device that is to receive the response. In some embodiments, modifying the API element may include removing a field from the set of fields, adding a field to the set of fields, modifying the name of a field from the set of fields, or modifying a type of a field from the set of fields. In some embodiments, one or a combination of these operations can be performed on fields of the API element to obtain an updated API element. The updated API element may include a subset of updated fields as well as unchanged fields from the set of fields. The updated API element is then sent to the gateway module to be included in a second API response. The second API response is transmitted to the client device 110A, at operation 450. In some embodiments, the updated element may include fields from two or more elements received at the gateway module 210.

While the embodiments described above describe a scenario where requests/responses of a first version of an API are converted into requests/responses of a second version of the API, in other embodiments, only one of a request or response may need to be converted. For example, when an API is updated one or more fields of a request are updated while fields of the response to the request may not be updated. In this first scenario, a compute server may convert the request from a first version of an API to a second request in a second version of the API without converting the response that is received. In another example, when the API is updated one or more fields of a response are updated while fields of the request may not be updated. In this second scenario, a compute server may convert the response from a first version of an API to a second response in a second version of the API without converting the request that is received Running third-party code such as an API compatibility enabler in isolated execution environments improves the performance as compared with running code using a virtual machine or a container. Unlike other computing platforms that instantiate a containerized process for processing code that can take as much as ten seconds, an isolated execution environment can be started in as little as 5 ms because a new process does not need to be started. Thus, the overhead of running an isolated execution environment is small as compared to other computing platforms. Further, since the third-party code can be run in a single process, there are no expensive context switches like experienced with other computing platforms which means that more time is spent actually running the code instead of performing context switches. The embodiments described herein enable a transparent and efficient compatibility of multiple API versions between client devices and an origin server. The compute server automatically determines whether a request or response needs to be converted and using a worker script enables a fast execution of the conversion from the first version to a second version.

Distributed Emulation of Behavior of a Malicious Domain

A botnet includes a number of computing devices coupled within a network and communicating with other computing devices in an effort to complete repetitive tasks and objectives. For example, a botnet can be used to keep control of an Internet Relay Chat (IRC) channel, to distribute spam or malware, gather misappropriated information, or to participate in distributed denial-of-service attacks. Generally, botnets are considered malicious and a threat to a network, which needs to be detected and neutralized. A command and control server is a centralized computing device that is able to send commands and receive responses from the other computing devices part of the botnet. A command and control server can be identified and sometimes neutralized, however this may not remove the threat posed by the deployed botnet.

A method and apparatus that provide a malicious domain emulator in a distributed cloud computing network is described. In addition to the services described above with respect to FIG. 1 and FIGS. 2A-4B, the cloud computing platform can also provide a service including emulation of behavior of malicious domains and logging of activity related to the malicious domains. These services can be provided through the execution of a malicious node emulator that is executed at the compute servers of the cloud computing platform. In some embodiment, the service of emulation of malicious domain behavior can be provided in addition to the service of API compatibility, such that each compute server may be deployed to include scripter workers with an API compatibility enabler and a malicious domain emulator. In other embodiments, the services can be offered separately, and some customers may use the API compatibility service, while others may use the malicious domain emulation service.

The malicious node emulator is executed as a third-party code at the PoP of the cloud computing platform to enable emulation of behavior of a malicious node. The malicious node emulator emulates the behavior of a server hosting the malicious domain. The malicious node emulator receives requests from one or multiple network devices addressed to the malicious domain and automatically emulates the behavior of the malicious domain to respond to these requests. In some embodiments, the malicious node emulator may log information related to the requests and the network devices transmitting the requests. According to some embodiments, the malicious node emulator is implemented as a worker script or a function of a worker script.

In an embodiment, a particular malicious node emulator is loaded as a part of a worker script and executed on-demand (when and only if it is needed) at a particular compute server of the distributed cloud computing network. Each request, received from a client device, that is addressed to a malicious domain is handled by the malicious node emulator at the compute server that is closest to the requesting client device. For instance, when responding to a client device in New Zealand, a malicious node emulator and worker script is run in a compute server in New Zealand that is closest to the client device. The compute server that receives the request may be determined by the network infrastructure according to an Anycast implementation or by a geographical load balancer.

The emulation of the behavior of the malicious domain allows the identification and monitoring of the operations of the client devices forming the botnet, which are controlled by the command and control server that hosts the malicious domain. As will be described in further details herein the use of emulation node emulator(s) that are part of worker scripts to emulate the behavior of a malicious domain provides a dynamic mechanisms that can accommodate changes needed to received information related to requests made by infected client devices. Further, the use of the worker script allows the malicious domain emulation service to scale and quickly adapt to changes that occur in the behavior of the server hosting the malicious domain.

Figure 5A:
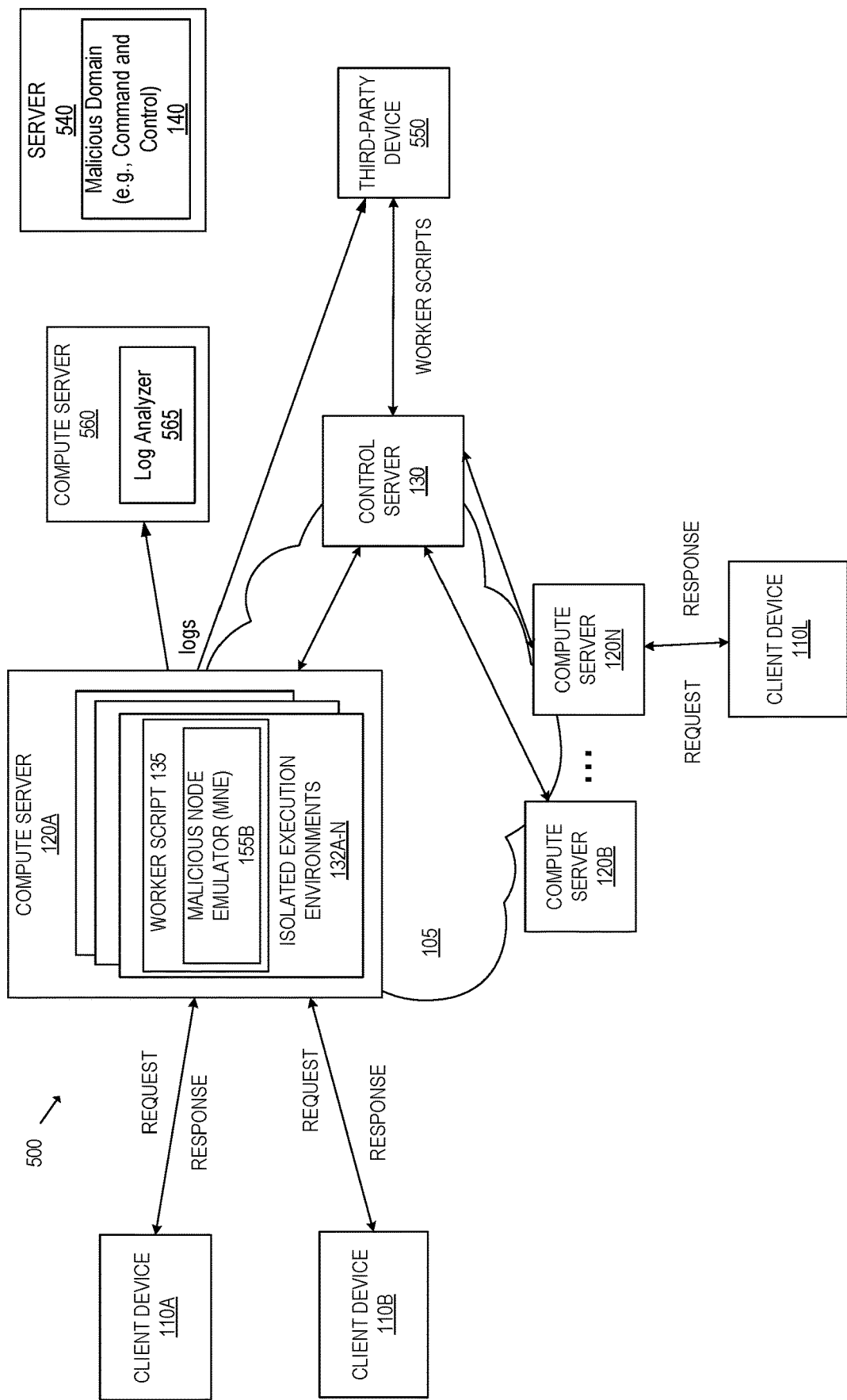
FIG. 5A illustrates an exemplary embodiment of a cloud computing platform that executes a malicious node emulator in a distributed cloud computing network, according to an embodiment.

FIG. 5A illustrates an exemplary embodiment of a cloud computing platform that executes a malicious node emulator in a distributed cloud computing network, according to an embodiment. In the description herein the same reference numbers refer to the same elements as described in FIG. 1. For the sake of clarity, the operations and characteristics of these elements described with reference to FIG. 1 are not repeated herein. The system 500 includes the client devices 110A-L, the compute servers 120A-N, the control server 130, the malicious server 540, the server 560, and the third-party device 550.

Each one of the client devices 110A-L may be susceptible to being infected with viruses, worms, or other vulnerabilities and may be part of a botnet network. The client devices 110A-L are operative to transmit requests for the malicious domain hosted at the server 160 and receive responses to these requests. The responses can include keep alive instructions, or other commands from the malicious server 560 that enable each one of the client devices 110A-L to continue the malicious activity.

The control server 130 may allow a customer of the cloud computing platform or an entity (administrator or employee) of the cloud computing platform to identify a malicious domain and indicate that traffic received for the malicious domain is to trigger execution of a malicious node emulator 155B. Further, the control server 130 may allow the customer to upload one or more worker scripts and may allow the customer to specify when the worker script(s) are to be run. For instance, the customer may configure a malicious node emulator 155B that allows to emulate the behavior of a malicious domain. In some embodiments, the customer can further configure a malicious node emulator to further log activity related to the malicious domain. In some embodiments, the control server 130 may allow a customer to upload a first type of worker scripts that allow emulation of behavior of the malicious domain and a second type of worker scripts that allow the logging of activity for the malicious domain. In other embodiments, a single set of worker scripts can be used to both emulate the behavior and log the activity for the malicious domain. The control server 130 may allow the customer to delete and update previously uploaded malicious node emulators or to modify the configuration of already uploaded Malicious node emulators.

In one embodiment, the control server 130 deploys each malicious node emulator to each of the compute servers 120A-N automatically (without the customer selecting which of the compute servers 120A-N in which to deploy the worker script). In another embodiment, the control server 130 allows the customer to indicate which of the compute servers 120A-N are to deploy a particular malicious node emulator. In some embodiments, the control server 130 may create an identifier for each malicious node emulator worker script. In an embodiment, the identifier is created by hashing the content of the malicious node emulator (e.g., using a cryptographic hash function such as SHA-256), where two scripts with identical content will have the same identifier even if uploaded by different customers and even if applied to different zones.

In an embodiment, the control server 130 allows a customer the ability to provision emulation and monitoring of the behavior of the malicious domain through deployment of the malicious node emulator(s) to the cloud computing platform through DNS. For example, DNS record(s) of the malicious domain are changed such that DNS records of a hostname point to an IP address of a compute server instead of the server 140. In some embodiments, the authoritative name server of the malicious domain is changed to an authoritative name server of the service and/or individual DNS records are changed to point to the compute server (or point to other domain(s) that point to a compute server of the service). For example, the DNS records of the malicious domain can be changed to point to a CNAME record that points to a compute server of the service. In one embodiment, a customer of the cloud computing platform can force the owner of the malicious domain to change their DNS records to point to a compute server of the service. The customer can be a regulatory authority, a law enforcement agency, or any other entity with authority over the owner of the malicious domain. The customer may use the control server 130 or may cause the owner of the malicious domain to change the authoritative name server associated with the malicious domain to an authoritative name server of the cloud computing platform and/or change the zone file records to have the malicious domain point to the compute servers. Pointing the DNS or similar records to the compute server 120A enables the compute server to act as a proxy for requests directed to the origin server. In this manner, the requests sent to the server 540 hosting the malicious domain pass through the compute server and enable the malicious node emulator to examine the requests and to emulate the behavior of the server hosting the malicious domain. In some embodiments, the compute servers of the cloud computing platform can further act as DNS servers that are operative to receive DNS requests. In these embodiments, the DNS records of these servers are modified as described above causing traffic destined to the malicious domain to be routed to the compute servers of the cloud computing platform. In other embodiments, the DNS service can be fulfilled by another computing platform that is separate from the cloud computing platform including the compute servers 120A-N. In these embodiments, the DNS records of the DNS service are modified as described above causing traffic destined to the malicious domain to be routed to the compute servers of the cloud computing platform.

The third-party device 550 is a computing device (e.g., laptop, workstation, smartphone, mobile phone, tablet, etc.) that is used by third-parties to, among other things, configure the malicious node emulator to run in the cloud computing platform. A third-party may be a customer of the cloud computing platform and/or a party that is to configure the malicious node emulator code to run in the cloud computing platform on behalf of the customer. The customer can be a regulatory authority, a law enforcement agency, or any other entity with authority over the owner of the malicious domain. The customer is able to identify the behavior of the malicious domain and configure the malicious node emulator to emulate this behavior.

The server 540, which may be owned or operated directly or indirectly by a malicious entity, is a computing device that transmits commands to multiple computing devices forming a network of bots (i.e., a botnet) (e.g., to client device 110A when the client device is part of the botnet), and receives reports or requests from these devices. The server 540 can be referred to as a command and control server. In a botnet, the computing devices forming the network of bots, are infected with a Trojan horse and subsequently communicate with the command and control server using various communication channels (e.g., Internet Relay Chat (IRC), JPEG images, Microsoft Word files and/or posts from dummy accounts of social media platforms may be used as communication channels for transmitting/receiving commands between the command and control server and the bots of a botnet). The botnet can be used to gather information, such as credit card numbers, confidential information, private and personnel information etc. Depending on the purpose and structure of the botnet, the server 140 might also issue commands to start sending spam or begin a distributed denial of service (DDoS) attack. Although FIG. 5A illustrates the server 540 communicating with the compute server 120A, the server 540 may also communicate with one or more of the other compute servers 120B-N. Similarly, while FIG. 5A illustrates a case with a single malicious server, the cloud computing platform can be used to emulate and monitor the behavior of any number of malicious servers, where each malicious server is associated with a separate malicious node emulator distributed to the compute servers.

As discussed earlier, the compute servers 120A-N may operate as a reverse proxy and receive requests for network resources (e.g., HTTP requests) of a domain (e.g., the malicious domain of the server 540). The particular compute server (e.g., compute server 120A) that receives a request from a client device may be determined by the network infrastructure according to an anycast implementation or by a geographical load balancer. For instance, the compute servers 120A-N may have a same anycast Internet Protocol (IP) address for the malicious domain of the server 540. If the server 540 handles the domain "maliciousexample.com," a domain name service (DNS) request for "maliciousexample.com" returns an address record having the anycast IP address of the compute servers 120A-N. Which one of the compute servers 120A-N receives a request from a client device depends on which one of the compute servers 120A-N is closest to the client device in terms of routing protocol configuration (e.g., Border Gateway Protocol (BGP) configuration) according to an anycast implementation as determined by the network infrastructure (e.g., router(s), switch(es), and/or other network equipment between the requesting client and the compute servers 120A-N. By way of example, the client device 110A and the client device 110B are closest to the compute server 120A, and the client device 110L is closest to the compute server 120N. Accordingly, requests from the client device 110A or from the client device 110B are received at the compute server 120A, and requests from the client device 110L are received at the compute server 120N. In some embodiments, instead of using an anycast mechanism, a geographical load balancer is used to route traffic to the nearest compute server. The distribution of the requests for the malicious domain to one or multiple compute servers 120A-N of the cloud computing platform allows the solution described herein to scale efficiently when there is an increase in the requests received from devices of the botnet.

In the example of FIG. 5A, each of the compute servers 120A-N can execute the worker script(s) of a third-party such as the malicious node emulators of customers. Each worker script is run in an isolated execution environment, such as running in an isolate of the V8 JavaScript engine. Thus, as illustrated in FIG. 5A, the compute server 120A includes the isolated execution environments 132A-N that each executes a separate worker script 135B. The isolated execution environment 132A-N are run within a single process. The worker scripts are not executed using a virtual machine or a container. In an embodiment, a particular worker script, e.g., a worker script implementing a malicious node emulator, is loaded and executed on-demand (when and only if it is needed) at a particular compute server of the distributed cloud computing network. Each request for a domain (e.g., an API request) can trigger handling by a malicious node emulator and other worker scripts that will handle the request and response at the compute server that is closest to the requesting user.

The malicious node emulator 155B is a worker script that is executed on behalf of a customer at a compute server to monitor and emulate the behavior of a malicious domain. The operation of the malicious node emulator 155B is discussed herein below in further detail with reference to FIGS. 5B-9. Upon receipt of a request for a malicious domain from a client device, a compute server 120A that is part of a distributed cloud computing platform, determines whether the first request is destined to a malicious domain. The request is received at the compute server 120A instead of a server that hosts the malicious domain as a results of the malicious domain being registered with a proxy service of the cloud computing platform. The registration of the malicious domain with the proxy service causes requests for the malicious domain to be received to one or multiple compute servers of the cloud computing platform instead of a server that hosts the malicious domain. When it is determined that the request is not destined to a malicious domain, the compute server 120A fulfills the request. Alternatively, when it is determined that the request is destined to a malicious domain, the first compute server 120A executes, by a single process at the first compute server, a malicious node emulator. The malicious node emulator is run in one of a plurality of isolated execution environments to emulate the behavior of the malicious server hosting the malicious domain, and causes the compute server to: transmit, instead of the server that hosts the malicious domain, a response to the client device; and to log information related to the request. The transmitted response is consistent with an expected behavior of the malicious server as the malicious node emulator emulates the behavior of the malicious domain. The server 120A may receive and respond to multiple request for the malicious domain, the requests cause the execution of malicious node emulators in the same isolated execution environment.

Figure 5B:
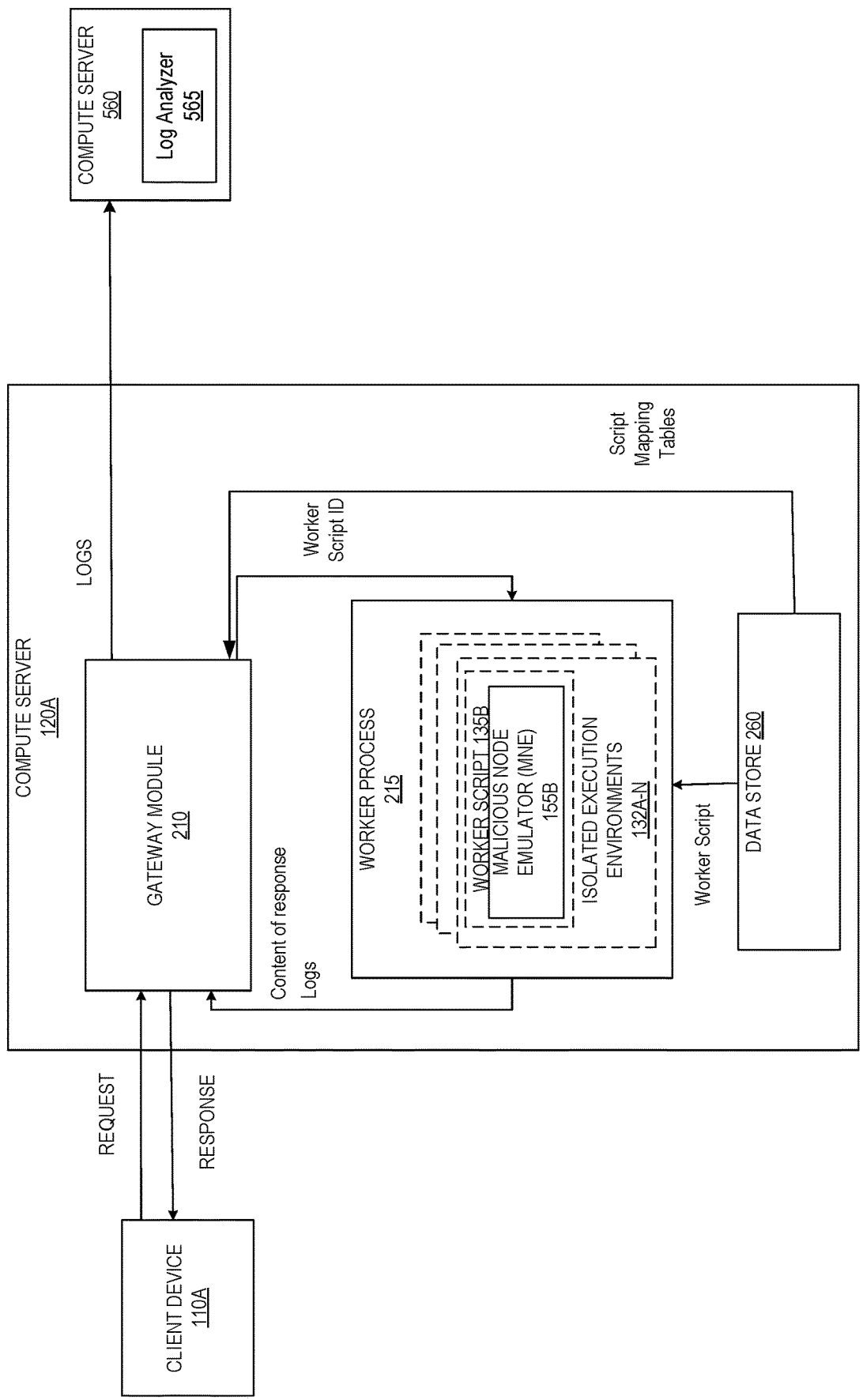
FIG. 5B illustrates an example of a compute server that is operative to execute a malicious node emulator, according to one embodiment.

FIG. 5B illustrates an example of a compute server 120A that is operative to execute a malicious node emulator, according to an embodiment. The compute server 120A includes a gateway module 210, a worker process 215, an optional cache 220, and a data store 260. The gateway module 210 receives and processes web requests and web responses (e.g., HTTP requests and HTTP responses). The gateway module 210 acts as a reverse proxy for the server 540. The data store 260 is configured to store, among other items, the worker scripts such as the malicious emulator code that are received from the control server 130.

Each worker process 215 is a single process that executes the isolated execution environments 132A-N. There may be hundreds to thousands of isolated execution environments that are run simultaneously by the worker process 215. Each different worker script such as worker script 135B, which includes the malicious node emulator 155B, is run by a different one of the isolated execution environments 132A-N each with its own heap or similar memory structure. The worker process 215 starts an isolated execution environment to load a particular worker script on the first use of the worker script. Depending on the complexity of the worker script, loading the worker script may take approximately tens to hundreds of milliseconds of processor time. A worker script stays loaded in memory between requests so that the worker script can be used to respond quickly when a new request that triggers that worker script arrives. Handling a single request for a worker script that is already loaded typically takes a fraction of a millisecond of processor time depending on the complexity of the worker script. In an embodiment, one isolated execution environment is created per unique worker script identifier. Thus, if many zones use identical worker scripts, memory is saved by compiling the script only once. The worker process 215 evicts worker scripts (e.g., in a least recently used fashion). The worker process 215 may be started during the booting of the compute server 120A or when the first worker script is triggered for execution.

The gateway module 210 receives a request from the client device 110A. The request may be an HTTP request for a zone of the malicious domain. A zone is a subset of a set of resources of the distributed computing platform. The gateway module 210 processes the request including determining whether the request triggers execution of a worker script such as the malicious node emulator 155B. For instance, the gateway module 210 analyzes a uniform resource locator (URL) in the request against the URL matching pattern configured for the zone to determine if a worker script such as the malicious node emulator 155B is to be executed. In some embodiments, the compute server receives an HTTP request from the client device 110A, and to determine whether the malicious node emulator is to be executed, the gateway module 210 may determine whether the URL in the HTTP request identifies a malicious domain that is associated with a worker script 135B including the malicious node emulator 155B.

If a worker script is not to be executed, the gateway module 210 fulfils the request received from the client device. In some embodiments, the fulfillment of the request may include retrieving a response for that request. To retrieve the response, the gateway module 210 may transmit the request to an origin server (not illustrated) or alternatively may retrieve the requested network resource from a cache (not illustrated).

If a worker script is to be executed, the gateway module 210 annotates the request with the identifier of the worker script to be executed as determined by a script mapping table and forwards the request to the worker process 215. If the identified worker script is already loaded (if there is already an isolated execution environment running an instance of the worker script), the worker process 215 does not need to load another instance of the worker script. However, if the identified worker script that is already loaded is from a different zone, the worker process 215 creates a separate context (a global object) for the worker script so that each zone has its own isolated global state. That prevents zones from interfering with the state of other zones. If the identified worker script is not loaded, the worker process 215 creates an isolated execution environment and loads and executes the worker script.

The executed worker script can take various actions depending on how the script is written. In some embodiments, the worker script generates the content of a response destined to the client device 110A on behalf of and instead of the server 540 that hosts the malicious domain. The content of the response is consistent with an expected behavior of the malicious server. In other words, the first response emulates a behavior of the server hosting the malicious domain by transmitting would have upon receipt of the first request. The worker script further generates a log including information related to the request received from the client device 110A. The worker script transmits the content of the response to the gateway module 210 to be transmitted to the client device 110A. For example, the content of the response can include a heartbeat message or keepalive message. The gateway module 210 transmits a response to the client device 110A including the content generated by the worker script without transmitting the response to the server hosting the malicious server. Thus, the compute server 120A acts as a sinkhole to the malicious domain such that requests for the malicious domain are received by the compute server 120A instead of the server 540, and the compute server 120A, through the execution of a worker script 135B that includes the malicious node emulator 155B, responds to the request on behalf of the server hosting the malicious domain. The gateway module 210 further transmits the logs including information related to the request to a compute server 560. The information related to the request may include one or a combination of information on the client device, content of the first request, and content of the first response.

Figure 5C:
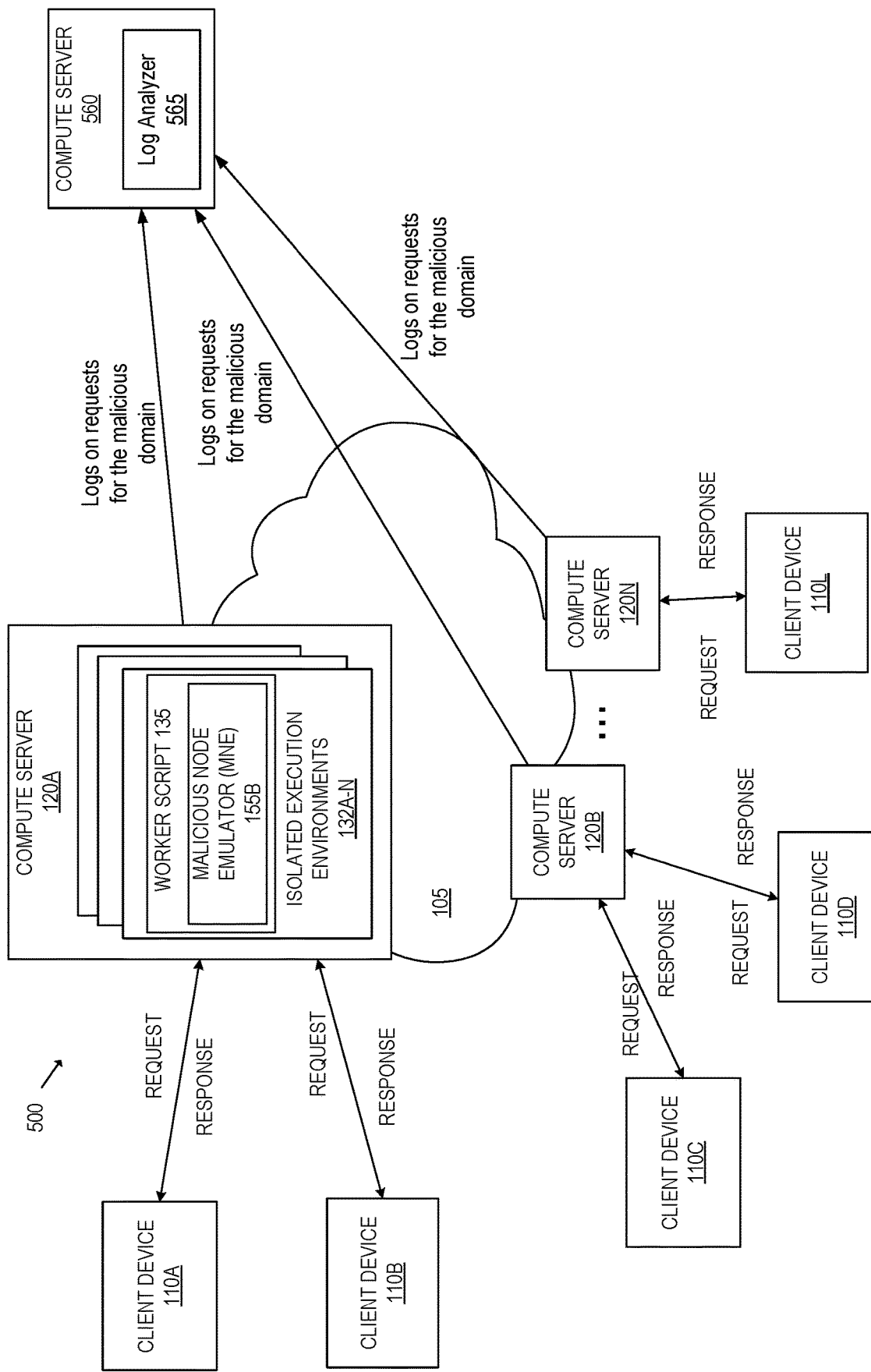
FIG. 5C is a block diagram illustrating an exemplary log analyzer in accordance with some embodiments.

FIG. 5C is a block diagram illustrating an exemplary log analyzer, in accordance with some embodiments. The compute server 560 may be part of the cloud computing platform 105. When the compute server 560 is part of the cloud computing platform 105, the log analysis performed via the log analyzer 565 can be provided as a service to the customers of the cloud computing platform. In other embodiments, the compute server 560 can be owned and/or operated by the customer of the cloud computing platform that has registered the malicious domain for proxy services. In these embodiments, the compute server 560 can be the same or different from the third-party device 550 and receives raw logs from one or more compute servers 120A-N of the cloud computing platform. The raw logs relate to the requests for the malicious domain received at the compute servers 120A-N, which triggered worker scripts including a malicious node emulator 155B.

The log analyzer 565 receives from one or more compute servers 120A-N (e.g., compute server 120A, compute server 120B, compute server 120N) information related to requests for the malicious domain. The log analyzer 565 analyzes the information to obtain insight on the bot network that is controlled by the server 540 that hosts the malicious domain. While the behavior of the server 540 may be known to the customer registering the domain with the proxy service of the cloud computing platform 105, the customer is interested in obtaining information related to the network of client devices that are infected by the malware controlled by the server 540. The emulation of the behavior of the malicious domain at the compute servers of the cloud computing platform enables the log analyzer 565 to gather information related to the infected devices as well as their behavior. In some embodiments, the information related to the requests may include an IP address of the client device making the request, a geographical location of the client device making the request, the type of request made, the response transmitted to the client device, a timestamp indicating a time at which the request is received by a compute server.

The log analyzer 565 analyzes the behavior of the malicious domain based at least in part on the information related to the request received from the client device 110A. In some embodiments, the analysis of the behavior of the malicious domain is further based on additional information related to one or more additional requests received from multiple client devices at one of the compute servers 120A-N. Upon receipt of the information from the compute server(s), the log analyzer may determine the geographical location of each one of client devices that are controlled by the server 560, determine a volume of requests received for the malicious domain; and determine bandwidth used by requests for the malicious domain. In some embodiments, the analysis can be performed for a single one of the compute servers 120A-N. In other embodiments, the analysis can be performed for each compute server as well as over the multiple compute servers 120A-N. In some embodiments, the analysis of the logs received from one or multiple compute servers 120A-N can provide additional information on the IP protocol used for transmitting the requests.

FIG. 5B illustrates an example of a compute server that is operative to execute a malicious node emulator, according to one embodiment. The embodiments described herein enable sinkhole a malicious domain. Sinkholing the malicious domain allows an entity, e.g., a customer of the cloud computing platform, to take control of the traffic destined for that domain such that the traffic can be observed to gain intelligence on the behavior of the malicious domain. In an exemplary scenario a command and control domain of a botnet is sinkholed to allow an observer to gain visibility on what the botnet is doing. For example, the observer may determine the location/identification of the infected network devices, the type of malicious activity the botnet is engaged in, and who the victims of attacks are.

Figure 6:
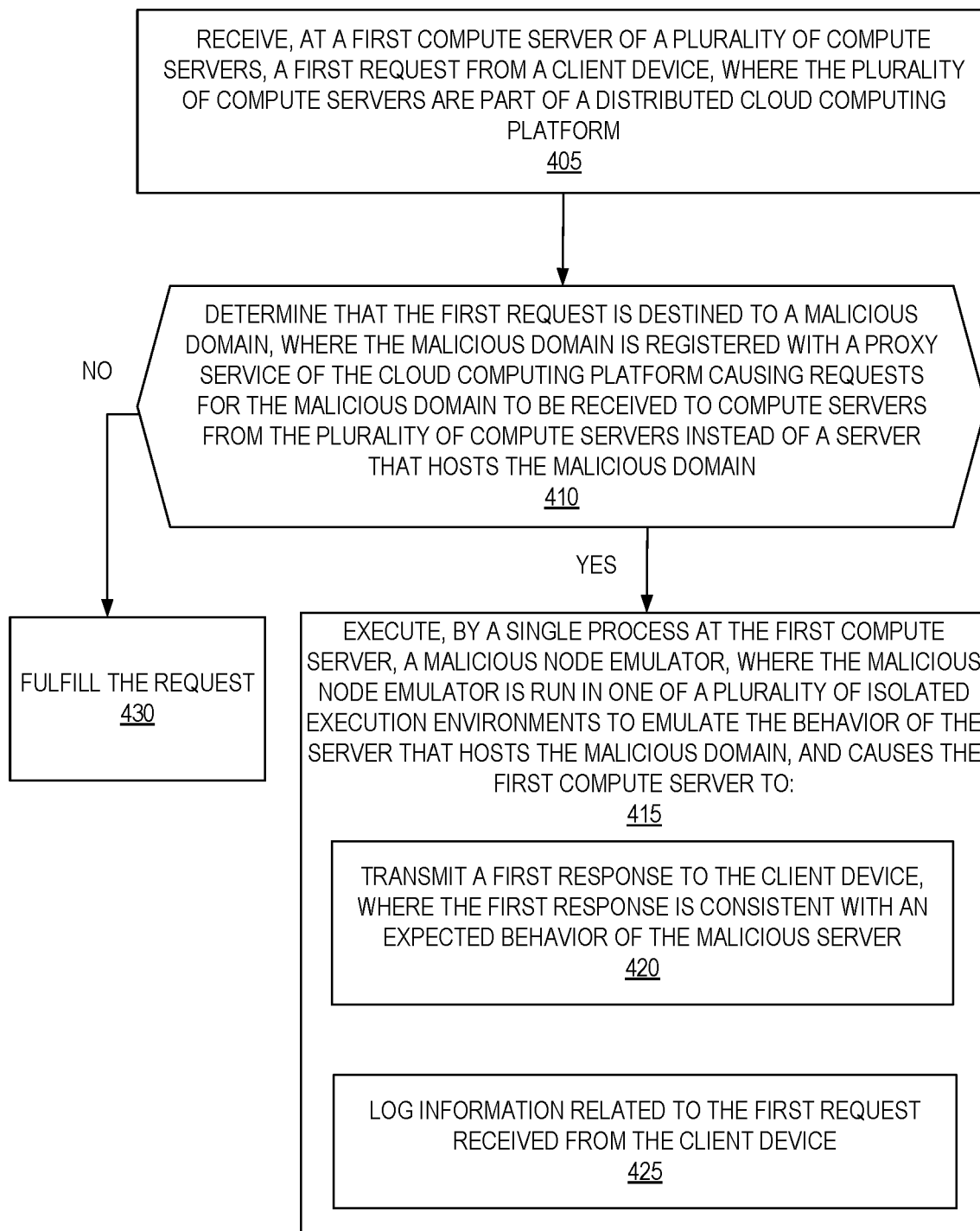
FIG. 6 is a flow diagram that illustrates exemplary operations for executing a malicious node emulator, according to an embodiment.

FIG. 6 is a flow diagram that illustrates exemplary operations for executing a malicious node emulator, according to an embodiment. At operation 405 a first request is received, at a first compute server of multiple compute servers, from a client device. The compute servers (e.g., servers 120A-N) are part of a distributed cloud computing platform. At operation 410, the first compute server (e.g., 120A) determines whether the first request is destined to a malicious domain. The malicious domain is registered with a proxy service of the cloud computing platform causing requests for the malicious domain to be received to compute servers from the plurality of compute servers instead of a server that hosts the malicious domain. When it is determined that the first request is not destined to a malicious domain, the flow of operations moves to operation 430 at which the first compute server 120A fulfills the first request. Alternatively, when it is determined that the first request is destined to a malicious domain, the flow of operations moves to operation 415 at which the first compute server 120A executes, by a single process at the first compute server, a malicious node emulator. The malicious node emulator is run in one of a plurality of isolated execution environments to emulate the behavior of the malicious server hosting the malicious domain, and causes the first compute server to perform operations 420 and 425. At operation 420, the first compute server 120A transmits a first response to the client device. The first response is consistent with an expected behavior of the malicious server. In other words, the first response emulates a behavior that the server hosting the malicious domain would have upon receipt of the first request. At operation 425, the first compute server 120A further logs information related to the first request received from the client device.

Running third-party code such as a malicious node emulator in isolated execution environments improves the performance as compared with running code using a virtual machine or a container. Unlike other computing platforms that instantiate a containerized process for processing code that can take as much as ten seconds, an isolated execution environment can be started in as little as 5 ms because a new process does not need to be started. Thus, the overhead of running an isolated execution environment is small as compared to other computing platforms. Further, since the third-party code can be run in a single process, there are no expensive context switches like experienced with other computing platforms which means that more time is spent actually running the code instead of performing context switches. The embodiments described herein enable a dynamic and adaptable malicious domain emulation and monitoring. The compute server automatically determines whether a request is destined for a malicious domain and using a worker script enables a fast emulation of the behavior of the behavior of the malicious domain as well as logging of information related to the request for the malicious domain. This allows to obtain insight on the botnet and the devices that are affected by a malware or more generally malicious code. The operations described herein can be offered as a service as part of the cloud computing platform to customers.

Figure 7:
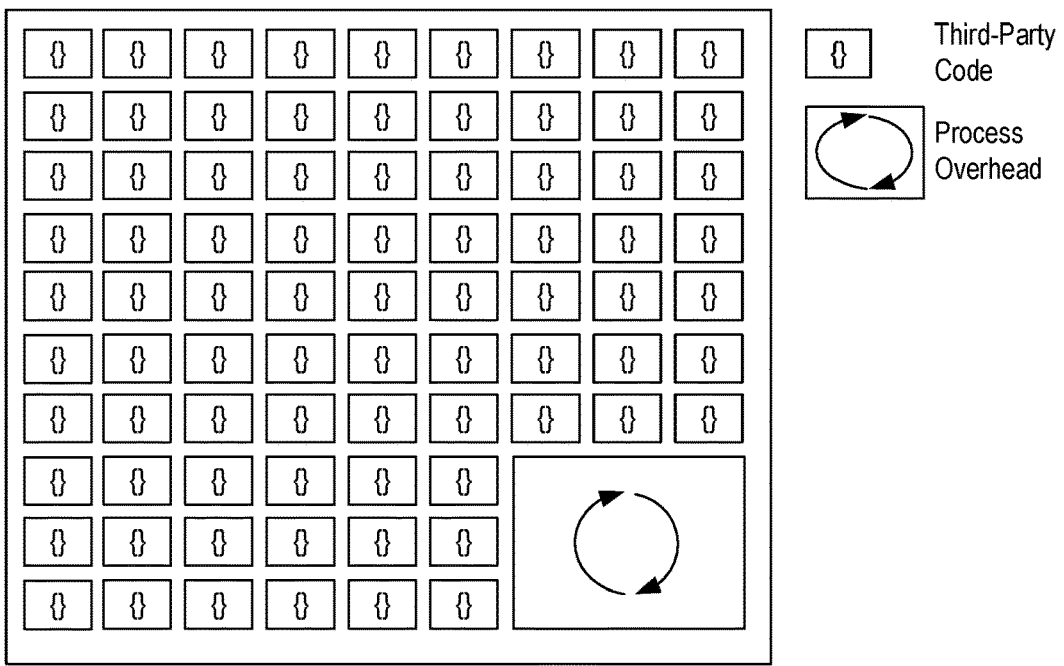
FIG. 7 is a conceptual figure that shows a conceptual relationship between third-party code and the process overhead of the isolated execution environment model that is described in the embodiments.

FIG. 7 is a conceptual figure that shows a conceptual relationship between third-party code and the process overhead of the isolated execution environment model that is described in embodiments herein. As shown, the isolated execution environment can include any number of third-party codes being managed as a set with a single process overhead. These third-party codes can be worker scripts such as the API compatibility enabler and/or the malicious node emulator, or similar code.

Figure 8:
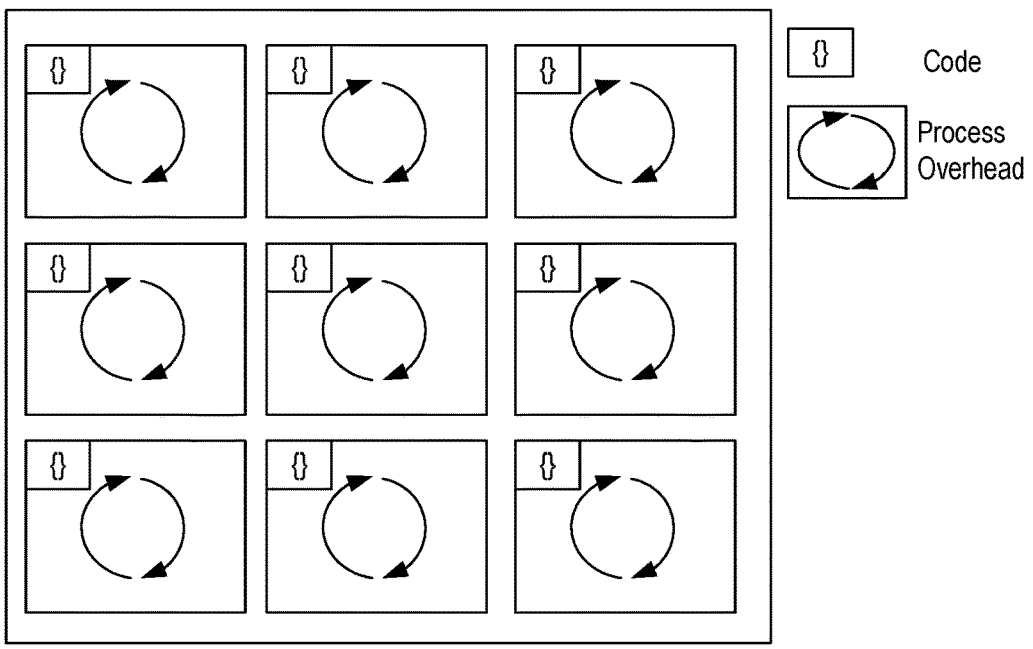
FIG. 8 is a conceptual figure that shows a conceptual relationship between code and the process overhead of a virtual machine model.

FIG. 8 is a conceptual figure that shows a conceptual relationship between code and the process overhead of a virtual machine model by way of comparison. As seen in FIGS. 7 and 8, the process overhead of the virtual machine model is experienced for each different code executed (a new process has to be started for each different code piece), whereas the process overhead of the isolated execution environment model is experienced once.

Figure 9:
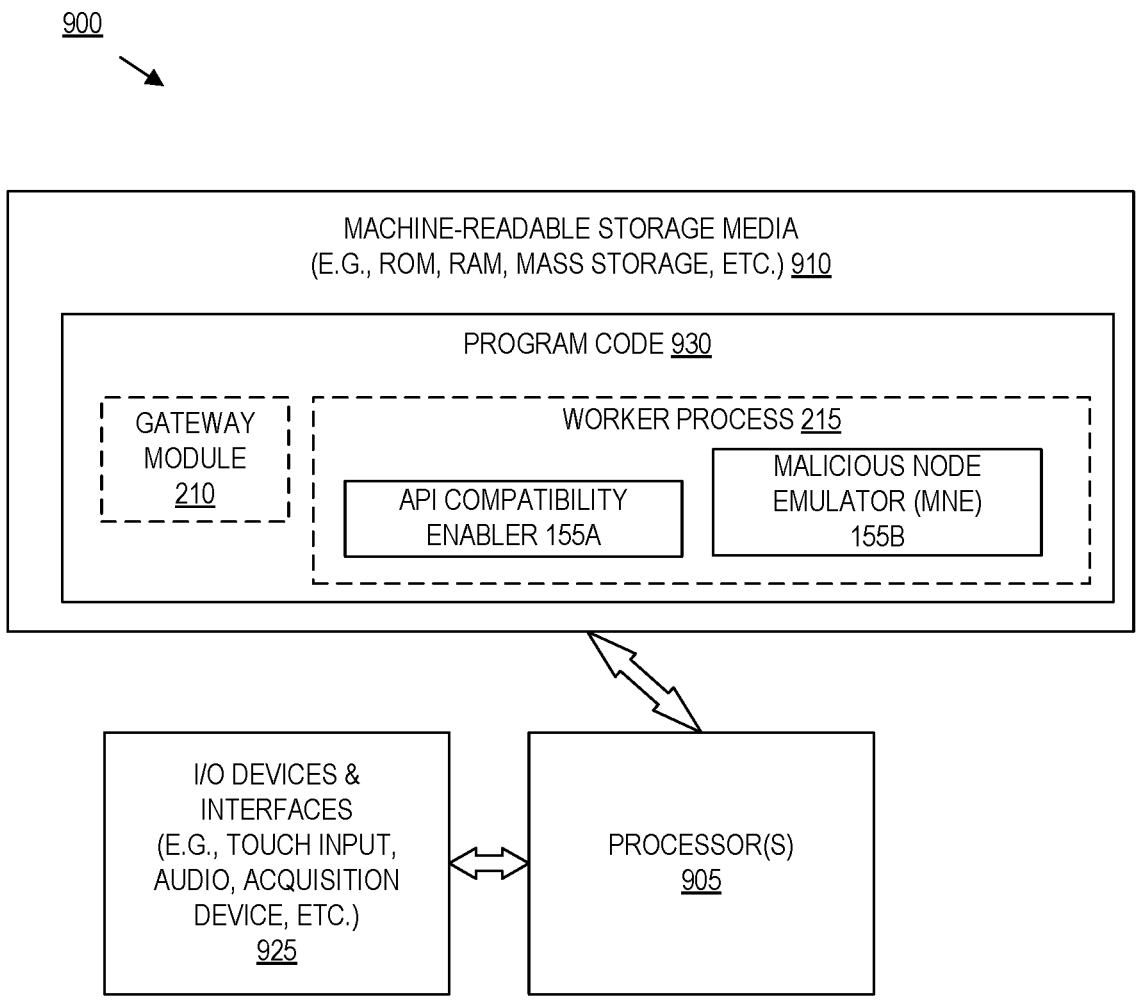
FIG. 9 illustrates a block diagram for an exemplary data processing system that may be used in some embodiments.

FIG. 9 illustrates a block diagram for an exemplary data processing system 900 that may be used in some embodiments. Data processing system 900 includes one or more processors 905 and connected system components (e.g., multiple connected chips). One or more such data processing systems 900 may be utilized to implement the embodiments and operations described with respect to the compute server, control server, or other electronic device.

The data processing system 900 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 910 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 905. For example, the depicted machine-readable storage media 910 may store program code 930 that, when executed by the processor(s) 905, causes the data processing system 900 to execute the gateway module 210 and/or the worker process(es) 215 including API compatibility enablers 155A and/or the malicious node emulator 155B as described herein.

The data processing system 900 also includes one or more input or output ("I/O") devices and interfaces 925, which are provided to allow a user to provide input to, receive output from, and otherwise transfer data to and from the system. These I/O devices 925 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 925 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 900 with another device, external component, or a network and receive stored instructions, data, tokens, etc. For instance, a wired or wireless transceiver may transmit and receive messages to and from the compute server as described herein.

Additional components, not shown, may also be part of the system 900, and, in certain embodiments, fewer components than that shown in FIG. 9 may also be used in a data processing system 900. One or more buses may be used to interconnect the various components shown in FIG. 9.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client device, compute server, DNS server, control server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising:
   receiving, at a first compute server of a plurality of compute servers, a first Application Programming Interface (API) request from a client device, wherein the plurality of compute servers are part of a distributed cloud computing platform, and wherein the receiving is a result of a Domain Name System (DNS) request for a domain associated with the first API request resolving to the first compute server instead of an origin server;
   determining whether the first API request is of a first version of an API that is different from a second version of the API used in the origin server to which the first API request is destined; and
   responsive to determining that the first API request is of the first version of the API that is different from the second version of the API used in an origin server to which the first API request is destined, performing:
      executing, by a single process at the first compute server, an API compatibility enabler, wherein the API compatibility enabler is run in one of a plurality of isolated execution environments to convert the first API request into a second API request in the second version of the API; and
      fulfilling the second API request instead of the first API request.

2. The method of claim 1 further comprising:
   receiving, in response to the second API request, a first API response;
   responsive to determining that the first API response is of the second version of the API, performing:
      executing, by the single process at the first compute server, the API compatibility enabler, wherein the API compatibility enabler is run in one of a plurality of isolated execution environments to convert the first API response into a second API response in the first version of the API; and
      transmitting the second API response to the client device.

3. The method of claim 2, wherein the first API request is different from the second API request and the first API response is identical to the second API response.

4. The method of claim 1, wherein the first API request includes a first version identifier identifying the first version of the API to which the first API request belongs.

5. The method of claim 4, wherein the determining that the first API request is of the first version of the API that is different from the second version of the API is performed based on the first version identifier and a set of one or more version identifiers uniquely identifying one or more versions of the API that are stored at the first compute server.

6. The method of claim 1, wherein the API compatibility enabler can be configured by a customer of the distributed cloud computing platform via a control server.

7. The method of claim 1, wherein the first API request includes a set of one or more fields, and wherein to convert the first API request into a second API request in the second version of the API includes at least one of to remove a first field from the set of fields, to add a second field to the set of fields, to modify a name of a third field from the set of fields, to modify a type of a fourth field from the set of fields.

8. A non-transitory machine-readable storage medium of a first one of a plurality of compute servers that provides instructions that, when executed by a processor, cause the processor to perform operations comprising:
   receiving, at a first compute server of a plurality of compute servers, a first Application Programming Interface (API) request from a client device, wherein the plurality of compute servers are part of a distributed cloud computing platform, and wherein the receiving is a result of a Domain Name System (DNS) request for a domain associated with the first API request resolving to the first compute server instead of an origin server;

determining whether the first API request is of a first version of an API that is different from a second version of the API used in the origin server to which the first API request is destined; and responsive to determining that the first API request is of the first version of an API that is different from the second version of the API used in an origin server to which the first API request is destined, performing:

executing, by a single process at the first compute server, an API compatibility enabler, wherein the API compatibility enabler is run in one of a plurality of isolated execution environments to convert the first API request into a second API request in the second version of the API; and fulfilling the second API request instead of the first API request.

9. The non-transitory machine-readable storage medium of claim 8, wherein the operations further comprise:

receiving, in response to the second API request, a first API response;

responsive to determining that the first API response is of the second version of the API, performing:

executing, by the single process at the first compute server, the API compatibility enabler, wherein the API compatibility enabler is run in one of a plurality of isolated execution environments to convert the first API response into a second API response in the first version of the API; and transmitting the second API response to the client device.

10. The non-transitory machine-readable storage medium of claim 9, wherein the first API request is different from the second API request and the first API response is identical to the second API response.

11. The non-transitory machine-readable storage medium of claim 8, wherein the first API request includes a first version identifier identifying the first version of the API to which the first API request belongs.

12. The non-transitory machine-readable storage medium of claim 11, wherein the determining that the first API request is of the first version of the API that is different from the second version of the API is performed based on the first version identifier and a set of one or more version identifiers uniquely identifying one or more versions of the API that are stored at the first compute server.

13. The non-transitory machine-readable storage medium of claim 8, wherein the API compatibility enabler can be configured by a customer of the distributed cloud computing platform via a control server.

14. The non-transitory machine-readable storage medium of claim 8, wherein the first API request includes a set of one or more fields, and wherein to convert the first API request into a second API request in the second version of the API includes at least one of to remove a first field from the set of fields, to add a second field to the set of fields, to modify a name of a third field from the set of fields, to modify a type of a fourth field from the set of fields.

15. A compute server comprising:

a set of one or more processors; and a non-transitory machine-readable storage medium that provides instructions that, when executed by the set of processors, cause the set of processors to perform the following operations:

receiving, at a first compute server of a plurality of compute servers, a first Application Programming Interface (API) request from a client device, wherein the plurality of compute servers are part of a distributed cloud computing platform, and wherein the receiving is a result of a Domain Name System (DNS) request for a domain associated with the first API request resolving to the first compute server instead of an origin server;

determining whether the first API request is of a first version of an API that is different from a second version of the API used in the origin server to which the first API request is destined; and responsive to determining that the first API request is of a first version of an API that is different from a second version of the API used in an origin server to which the first API request is destined, performing:

executing, by a single process at the first compute server, an API compatibility enabler, wherein the API compatibility enabler is run in one of a plurality of isolated execution environments to convert the first API request into a second API request in the second version of the API; and fulfilling the second API request instead of the first API request.

16. The compute server of claim 15, wherein the operations further comprise:

receiving, in response to the second API request, a first API response;

responsive to determining that the first API response is of the second version of the API, performing:

executing, by the single process at the first compute server, the API compatibility enabler, wherein the API compatibility enabler is run in one of a plurality of isolated execution environments to convert the first API response into a second API response in the first version of the API; and transmitting the second API response to the client device.

17. The compute server of claim 16, wherein the first API request is different from the second API request and the first API response is identical to the second API response.

18. The compute server of claim 15, wherein the first API request includes a first version identifier identifying the first version of the API to which the first API request belongs.

19. The compute server of claim 18, wherein the determining that the first API request is of the first version of the API that is different from the second version of the API is performed based on the first version identifier and a set of one or more version identifiers uniquely identifying one or more versions of the API that are stored at the first compute server.

20. The compute server of claim 15, wherein the API compatibility enabler can be configured by a customer of the distributed cloud computing platform via a control server.

21. The compute server of claim 15, wherein the first API request includes a set of one or more fields, and wherein to convert the first API request into a second API request in the second version of the API includes at least one of to remove a first field from the set of fields, to add a second field to the set of fields, to modify a name of a third field from the set of fields, to modify a type of a fourth field from the set of fields.

* * * * *